(12) United States Patent
Budianu et al.

(10) Patent No.: US 9,780,847 B2
(45) Date of Patent: Oct. 3, 2017

(54) CHANNEL FEEDBACK DESIGN FOR FREQUENCY SELECTIVE CHANNELS

(71) Applicant: QUALCOMM Incorporated, San Diego, CA (US)

(72) Inventors: Petru Cristian Budianu, San Diego, CA (US); Jing Sun, San Diego, CA (US); Siddhartha Mallik, San Diego, CA (US); Yongbin Wei, La Jolla, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/067,932

(22) Filed: Mar. 11, 2016

(65) Prior Publication Data

US 2016/0285525 A1 Sep. 29, 2016

Related U.S. Application Data

(60) Provisional application No. 62/139,425, filed on Mar. 27, 2015.

(51) Int. Cl.
*H04B 1/38* (2015.01)
*H04L 7/00* (2006.01)
(Continued)

(52) U.S. Cl.
CPC ......... *H04B 7/0417* (2013.01); *H04B 7/0452* (2013.01); *H04L 1/0025* (2013.01);
(Continued)

(58) Field of Classification Search
USPC ..... 375/219, 220, 221, 222, 240.26, 240.27, 375/259, 284, 285, 316, 295, 340, 346,
(Continued)

(56) References Cited

U.S. PATENT DOCUMENTS

| | | | |
|---|---|---|---|
| 8,111,782 B2* | 2/2012 | Kim | H04B 7/063 375/260 |
| 8,184,752 B2* | 5/2012 | Ko | H04B 7/0417 375/221 |

(Continued)

FOREIGN PATENT DOCUMENTS

| | | |
|---|---|---|
| EP | 2941037 A1 | 11/2015 |
| WO | WO-2014104117 A1 | 7/2014 |

(Continued)

OTHER PUBLICATIONS

Benjebbour et al., "Concept and Practical Considerations of Non-Orthogonal Multiple Access (NOMA) for Future Radio Access," 2013 International Symposium on Intelligent Signal Processing and Communication Systems (ISPACS), Naha, Nov. 12-15, 2013, pp. 770-774, XP_032541968, ISBN 978-1-4673-6360-0, Institute of Electrical and Electronics Engineers.

(Continued)

*Primary Examiner* — Linda Wong
(74) *Attorney, Agent, or Firm* — Holland and Hart LLP

(57) ABSTRACT

Channel feedback reporting for non-orthogonal wireless communication systems employing frequency selective channels. A plurality of channel feedback matrices corresponding to a plurality of sub-carriers of a sub-band for a non-orthogonal channel may be determined by a UE, and one or more effective channel feedback matrices for the sub-band may be determined based on the plurality of channel feedback matrices. Each of the one or more effective channel feedback matrices may be associated with corresponding sets of transmission strategies, where each of the corresponding sets of transmission strategies include one or more transmission strategies of a plurality of transmission strategies for the non-orthogonal channel. Channel feedback information representing the one or more effective channel feedback matrices may be reported to a base station, which (Continued)

may estimate channel quality for the plurality of transmission strategies based at least in part on the channel feedback information, for downlink transmissions to UEs over the non-orthogonal channel.

30 Claims, 13 Drawing Sheets

(51) Int. Cl.
| | |
|---|---|
| H04B 7/0417 | (2017.01) |
| H04L 5/00 | (2006.01) |
| H04B 7/0452 | (2017.01) |
| H04L 1/00 | (2006.01) |
| H04B 7/0456 | (2017.01) |
| H04B 7/06 | (2006.01) |

(52) U.S. Cl.
CPC ......... *H04L 1/0026* (2013.01); *H04L 1/0028* (2013.01); *H04L 1/0029* (2013.01); *H04L 5/0057* (2013.01); *H04B 7/0456* (2013.01); *H04B 7/0626* (2013.01)

(58) Field of Classification Search
USPC .......................................... 375/348, 356, 358
See application file for complete search history.

(56) References Cited

U.S. PATENT DOCUMENTS

| | | | | |
|---|---|---|---|---|
| 8,315,346 B2* | 11/2012 | Kim | ..................... | H04B 7/0417 375/354 |
| 8,644,422 B2* | 2/2014 | Gao | ..................... | H04B 7/0452 375/316 |
| 8,953,699 B2* | 2/2015 | Sayana | ................. | H04B 7/024 370/252 |
| 2007/0014272 A1* | 1/2007 | Palanki | ................... | H04B 7/04 370/344 |
| 2008/0043677 A1* | 2/2008 | Kim | ..................... | H04B 7/0417 370/332 |
| 2009/0238086 A1* | 9/2009 | Ringstrom | ........... | H04B 7/0417 370/252 |
| 2010/0103832 A1* | 4/2010 | Zhou | ..................... | H04B 7/0417 370/252 |
| 2011/0176484 A1* | 7/2011 | Vitthaladevuni | ..... | H04L 1/0003 370/328 |
| 2012/0281776 A1* | 11/2012 | Khojastepour | ...... | H04B 7/0417 375/260 |
| 2012/0320774 A1* | 12/2012 | Dai | ..................... | H04B 7/0417 370/252 |
| 2013/0201862 A1* | 8/2013 | Cui | ..................... | H04B 7/0452 370/252 |
| 2013/0315358 A1* | 11/2013 | Krishnamurthy | ..... | H04W 56/00 375/357 |
| 2014/0080420 A1* | 3/2014 | Yang | ..................... | H04L 51/043 455/63.4 |
| 2014/0226735 A1* | 8/2014 | Zhang | ................. | H04B 7/0452 375/260 |
| 2015/0372741 A1* | 12/2015 | Kim | ..................... | H04B 7/0413 370/329 |

FOREIGN PATENT DOCUMENTS

| | | |
|---|---|---|
| WO | WO-2016044076 A1 | 3/2016 |
| WO | WO-2016069191 A1 | 5/2016 |

OTHER PUBLICATIONS

ISA/EP, International Search Report and Written Opinion of the International Searching Authority, Int'l App. No. PCT/US2016/022885, Jun. 22, 2016, European Patent Office, Rijswijk, NL, 12 pgs.

* cited by examiner

CHANNEL FEEDBACK DESIGN FOR FREQUENCY SELECTIVE CHANNELS

CROSS REFERENCES

The present Application for Patent claims priority to U.S. Provisional Patent Application No. 62/139,425 by Budianu et al., entitled "Channel Feedback Design for Frequency Selective Channels," filed Mar. 27, 2015, assigned to the assignee hereof, and expressly incorporated by reference herein.

BACKGROUND

Field of the Disclosure

The present disclosure, for example, relates to wireless communication systems, and more particularly to channel feedback design and scheduling for non-orthogonal and/or frequency selective channels in a wireless communication system.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Communication systems may take advantage of multiple antenna techniques for increased reliability or capacity. Multiple antenna techniques include transmit diversity and multiple-input multiple output (MIMO) techniques. MIMO systems that employ $N_T$ transmit antennas and $N_R$ receive antennas may realize a capacity increase of $\min\{N_T, N_R\}$ over single antenna techniques. Another approach that may be used in certain situations includes the transmission of non-orthogonal downlink signals over the same resources to multiple users. However, in a multiple access system, the possible variations in techniques including single-user MIMO (SU-MIMO), multiple-user MIMO (MU-MIMO), and/or non-orthogonal multiple access (NOMA) can provide challenges in optimizing scheduling for multiple downlink transmissions to multiple UEs.

SUMMARY

The described features generally relate to one or more improved systems, methods, and/or apparatuses for channel feedback design and scheduling for frequency selective channels in a wireless communication system. In a single-user MIMO (SU-MIMO) case, for one transmission strategy and one sub-band, a UE may determine and report channel quality information (CQI) based on an effective signal-to-noise ratio (SNR), which may be a function of the average capacity of the tones in the sub-band. Even when multiple transmission strategies are available, the UE may select one of the transmission strategies and report the selected transmission strategy and corresponding CQI. However, in the case of multiple-user transmission strategies (e.g., MU-MIMO, non-orthogonal multiple access (NOMA), etc.), the base station may select a transmission strategy to optimize a metric that takes into account the multiple users (i.e., multiple UEs). To aid the base station's selection, the UE may report CQI for all available transmission strategies, with each CQI report being computed as an average across the tones of interest. However, the number of CQI reports (e.g., for multiple sub-bands) can be substantial and consume (or exceed) the available feedback capacity. The systems, methods, and/or apparatuses described in the present disclosure may reduce channel feedback requirements; reduce the complexity of UE channel feedback determinations; and in some cases reduce the total complexity (UE side+base station side) of determining/reporting channel feedback information and scheduling downlink transmissions for multiple UEs over one or more non-orthogonal channels.

A method for wireless communication at a UE is described, the method including determining sub-carrier channel information corresponding to a plurality of sub-carriers of a sub-band for a non-orthogonal channel, determining one or more effective channel feedback matrices for the sub-band based on the sub-carrier channel information, and reporting channel feedback information for channel quality estimation for the UE across a plurality of transmission strategies. Each of the one or more effective channel feedback matrices may be associated with corresponding sets of transmission strategies, where each of the corresponding sets of transmission strategies includes one or more transmission strategies of the plurality of transmission strategies for the non-orthogonal channel. The channel feedback information may represent the one or more effective channel feedback matrices.

An apparatus for wireless communication at a UE is described, the apparatus including means for determining sub-carrier channel information corresponding to a plurality of sub-carriers of a sub-band for a non-orthogonal channel, means for determining one or more effective channel feedback matrices for the sub-band based on the sub-carrier channel information, and means for reporting channel feedback information for channel quality estimation for the UE across a plurality of transmission strategies. Each of the one or more effective channel feedback matrices may be associated with corresponding sets of transmission strategies, where each of the corresponding sets of transmission strategies includes one or more transmission strategies of the plurality of transmission strategies for the non-orthogonal channel. The channel feedback information may represent the one or more effective channel feedback matrices.

Another apparatus for wireless communication at a UE is described, the apparatus including a processor, memory in electronic communication with the processor, and instructions stored in the memory. The instructions may be executable by the processor to determine sub-carrier channel information corresponding to a plurality of sub-carriers of a sub-band for a non-orthogonal channel, to determine one or more effective channel feedback matrices for the sub-band based on the sub-carrier channel information, and to report channel feedback information for channel quality estimation for the UE across a plurality of transmission strategies. Each of the one or more effective channel feedback matrices may be associated with corresponding sets of transmission strategies, where each of the corresponding sets of transmission strategies includes one or more transmission strategies of the plurality of transmission strategies for the non-orthogonal channel. The channel feedback information may represent the one or more effective channel feedback matrices.

A non-transitory computer-readable medium storing computer-executable code for wireless communication at a UE is described, the code executable by a processor to determine sub-carrier channel information corresponding to a plurality of sub-carriers of a sub-band for a non-orthogonal channel, to determine one or more effective channel feedback matrices for the sub-band based on the sub-carrier channel information, and to report channel feedback information for channel quality estimation for the UE across a plurality of transmission strategies. Each of the one or more effective channel feedback matrices may be associated with corresponding sets of transmission strategies, where each of the corresponding sets of transmission strategies includes one or more transmission strategies of the plurality of transmission strategies for the non-orthogonal channel. The channel feedback information may represent the one or more effective channel feedback matrices.

In some examples, the method may further include identifying a set of channel quality functions for each of the one or more effective channel feedback matrices. In some examples, the set of channel quality functions may be identified based at least in part on the corresponding set of transmission strategies for each of the one or more effective channel feedback matrices. In some examples, the method may further include selecting the set of channel quality functions to optimize at least one of a maximum capacity error across the corresponding set of transmission strategies or an average capacity error across the corresponding set of transmission strategies. In some examples, selecting the channel quality function may be based at least in part on a likelihood of selection of transmission strategies of the set of transmission strategies. Some examples of the apparatuses and/or non-transitory computer-readable medium described above may include means for, instructions that are executable by the processor for, and/or code for performing these features.

In some examples of the method described above, the plurality of transmission strategies are grouped for the corresponding sets of transmission strategies according to respective precoding matrices. In some examples, the method may further include transmitting an indication that a subset of the plurality of transmission strategies should not be used for communication with the UE. In some examples, the method may further include determining, for each transmission strategy of the corresponding sets of transmission strategies, an amount of channel quality error resulting from a corresponding one of the one or more effective channel feedback matrices, and determining that the amount of channel quality error for each transmission strategy in the subset of transmission strategies is greater than a threshold. Some examples of the apparatuses and/or non-transitory computer-readable medium described above may include means for, instructions that are executable by the processor for, and/or code for performing these features.

In some examples of the method described above, the sub-carrier channel information may be determined based on a channel matrix and a noise covariance matrix for a sub-carrier of the plurality of sub-carriers. In some examples of the method described above, the plurality of transmission strategies may include at least one single user transmission strategy and at least one multiple-user transmission strategy. In some examples, the plurality of transmission strategies may include at least one multiple-layer transmission strategy including non-orthogonal layers. Some examples of the apparatuses and/or non-transitory computer-readable medium described above may include means for, instructions that are executable by the processor for, and/or code for performing these features.

A method for wireless communication at a base station is described, the method including receiving channel feedback information from multiple UEs for a non-orthogonal channel, where the channel feedback information from each UE includes feedback representing one or more effective channel feedback matrices for a plurality of sub-carriers of one or more sub-bands, and where each of the one or more effective channel feedback matrices corresponds to a set of transmission strategies of a plurality of transmission strategies for the non-orthogonal channel. The method may also include estimating channel quality for the plurality of transmission strategies for at least a subset of the multiple UEs for downlink transmissions over the non-orthogonal channel based at least in part on the channel feedback information, determining respective transmission strategies for the downlink transmissions based on the estimated channel quality, and transmitting downlink transmissions to the at least the subset of the multiple UEs over the non-orthogonal channel according to the respective transmission strategies.

An apparatus for wireless communication at a base station is described, the apparatus including means for receiving channel feedback information from multiple UEs for a non-orthogonal channel, where the channel feedback information from each UE includes feedback representing one or more effective channel feedback matrices for a plurality of sub-carriers of one or more sub-bands, and where each of the one or more effective channel feedback matrices corresponds to a set of transmission strategies of a plurality of transmission strategies for the non-orthogonal channel. The method may also include means for estimating channel quality for the plurality of transmission strategies for at least a subset of the multiple UEs for downlink transmissions over the non-orthogonal channel based at least in part on the channel feedback information, means for determining respective transmission strategies for the downlink transmissions based on the estimated channel quality, and means for transmitting downlink transmissions to the at least the subset of the multiple UEs over the non-orthogonal channel according to the respective transmission strategies.

Another apparatus for wireless communication at a base station is described, the apparatus including a processor, memory in electronic communication with the processor, and instructions stored in the memory. The instructions may be executable by the processor to receive channel feedback information from multiple UEs for a non-orthogonal channel, where the channel feedback information from each UE includes feedback representing one or more effective channel feedback matrices for a plurality of sub-carriers of one or more sub-bands, and where each of the one or more effective channel feedback matrices corresponds to a set of transmission strategies of a plurality of transmission strategies for the non-orthogonal channel. The instructions may also be executable by the processor to estimate channel quality for the plurality of transmission strategies for at least a subset of the multiple UEs for downlink transmissions over the non-orthogonal channel based at least in part on the channel feedback information, to determine respective transmission strategies for the downlink transmissions based on the estimated channel quality, and to transmit downlink transmissions to the at least the subset of the multiple UEs over the non-orthogonal channel according to the respective transmission strategies.

A non-transitory computer-readable medium storing computer-executable code for wireless communication at a base station is described, the code executable by a processor to receive channel feedback information from multiple UEs for a non-orthogonal channel, where the channel feedback information from each UE includes feedback representing one or more effective channel feedback matrices for a plurality of sub-carriers of one or more sub-bands, and where each of the one or more effective channel feedback matrices corresponds to a set of transmission strategies of a plurality of transmission strategies for the non-orthogonal channel. The code may also be executable by the processor to estimate channel quality for the plurality of transmission strategies for at least a subset of the multiple UEs for downlink transmissions over the non-orthogonal channel based at least in part on the channel feedback information, to determine respective transmission strategies for the downlink transmissions based on the estimated channel quality, and to transmit downlink transmissions to the at least the subset of the multiple UEs over the non-orthogonal channel according to the respective transmission strategies.

In some examples of the method described above, determining the respective transmission strategies for the multiple UEs may include determining a plurality of UE pairings for a same set of resources of the non-orthogonal channel. In some examples, the channel feedback information representing a given effective channel feedback matrix of the one or more effective channel feedback matrices may include at least one indicator of effective individual layer channel quality and an indicator of effective combined layer channel quality. In some examples, the plurality of transmission strategies may include transmission strategies for a two-layer MIMO environment, and the at least one indicator of effective individual layer channel quality may include a first effective single-user channel quality for a first layer and a second effective single-user channel quality for a second layer. In some examples, the method may further include partitioning the plurality of transmission strategies into the one or more sets of transmission strategies, and transmitting an indication of the one or more sets of transmission strategies to the multiple UEs. The indication may be transmitted prior to receiving the channel feedback information. Some examples of the apparatuses and/or non-transitory computer-readable medium described above may include means for, instructions that are executable by the processor for, and/or code for performing these features.

In some examples of the method described above, the plurality of transmission strategies may include at least one single user transmission strategy and at least one multiple-user transmission strategy. In some examples, the plurality of transmission strategies may include at least one multiple-layer transmission strategy including non-orthogonal layers. Some examples of the apparatuses and/or non-transitory computer-readable medium described above may include means for, instructions that are executable by the processor for, and/or code for performing these features.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
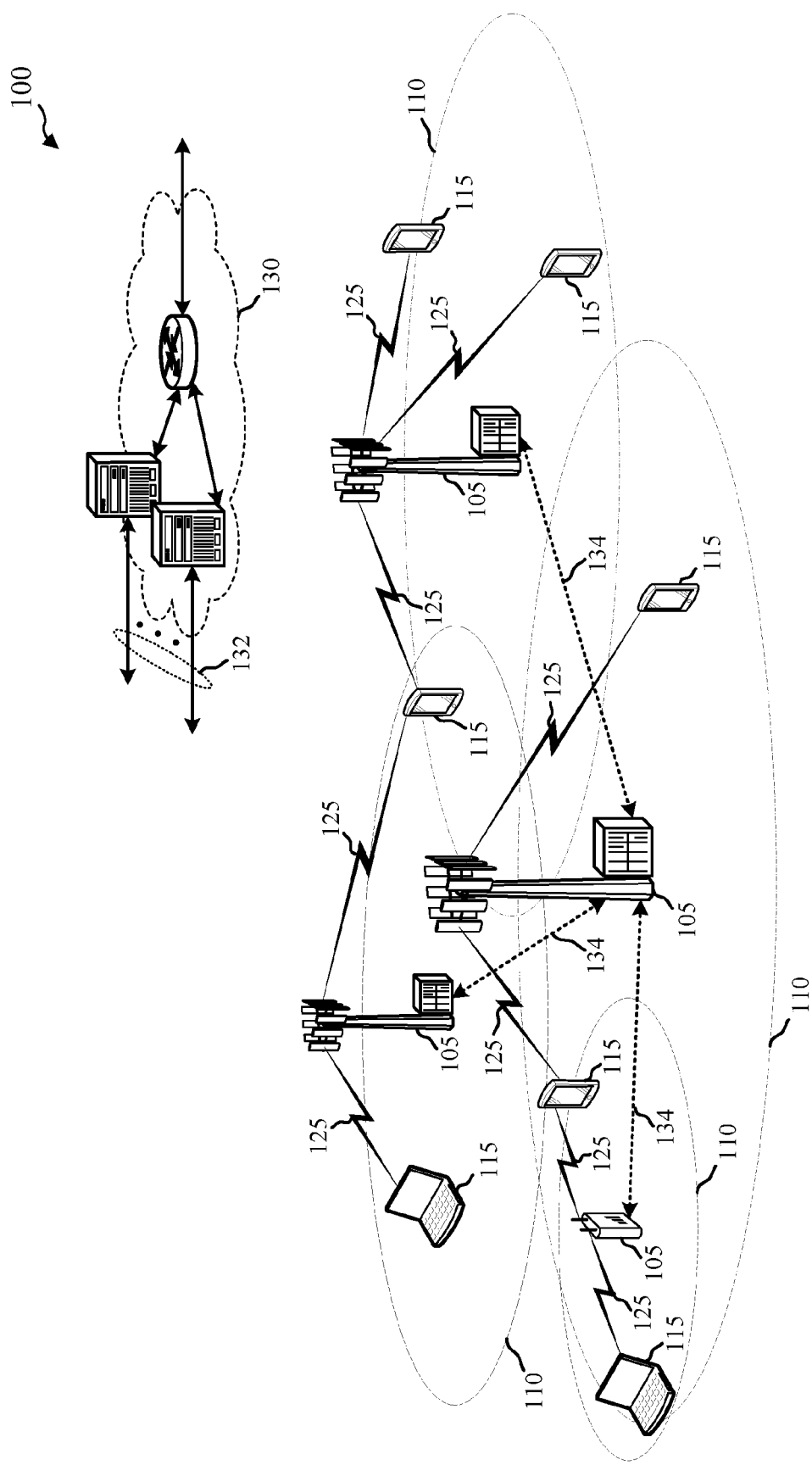
FIG. 1 shows a block diagram of a wireless communication system, in accordance with various aspects of the present disclosure.

Techniques generally relating to one or more improved systems, methods, and/or apparatuses for channel feedback design and scheduling for frequency selective channels in a wireless communication system are described. Where a base station serves multiple UEs having different channel conditions which may support orthogonal or non-orthogonal transmission techniques, the possible ways that UEs can share time, frequency, and/or spatial layer resources using various transmission strategies becomes large. To take advantage of the variety of techniques, channel feedback from the multiple UEs should allow the base station to estimate channel quality across many transmission strategies and sub-bands. Described herein are techniques employing feedback based on one or more effective channel feedback matrices that can be used to estimate channel quality across a range of transmission strategies. The effective channel feedback matrices may be determined by grouping transmission strategies for feedback and determining channel quality functions for each group of transmission strategies. The effective channel feedback matrices may be determined by evaluating sub-carrier channel information (e.g., channel feedback matrices determined for each sub-carrier or sub-band, etc.) according to the channel quality functions. The sub-carrier channel information may be determined utilizing a channel matrix and a noise covariance matrix for the non-orthogonal channel.

The channel quality functions may be chosen to minimize error across the range of transmission strategies by optimizing a maximum capacity error and/or an average capacity error across the transmission strategies. Additionally or alternatively, the channel quality functions may be chosen based on a likelihood of which transmission strategies will be chosen by the base station for future communications. In some cases, transmission strategies corresponding to an effective channel feedback matrix may use the same precoding matrix. In some cases, the transmission strategies may include single user transmission strategies and multiple-user transmission strategies. Additionally or alternatively, the transmission strategies may include multiple-layer (e.g., orthogonal or non-orthogonal layers) transmission strategies. If the UE determines that some transmission strategies should not be used for communications with the base station, the UE may transmit an indication to the base station of the transmission strategies to be avoided. In some cases, this determination may arise from calculating a channel quality error amount for each transmission strategy and, for the transmission strategies that should not be used, determining that the channel quality error amount is above a threshold. In some examples, the channel quality error may be based on an average SNR error for a corresponding transmission strategy.

A base station may receive channel feedback information in the form of components of one or more effective channel feedback matrices from multiple UEs for a non-orthogonal channel. The base station may subsequently estimate the channel quality for various transmission strategies based on the channel feedback information. Based on this estimation, the base station may then determine which transmission strategies to use for future communications with the UEs, and subsequently transmit downlink transmissions to at least some of the UEs over the non-orthogonal channel according to the chosen transmission strategies. In some cases, the base station may determine which transmission strategies to use by determining multiple UE pairings for the same resources of the non-orthogonal channel. In some cases, the base station may partition the transmission strategies into groups and transmit an indication of these groups to the multiple UEs. The multiple UEs may subsequently use these groups in determining the effective channel feedback matrices.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100 in accordance with various aspects of the present disclosure. The wireless communication system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro and/or small cell base stations). There may be overlapping geographic coverage areas 110 for different technologies.

In some examples, the wireless communication system 100 may be an LTE/LTE-A network. In LTE/LTE-A networks, the term evolved Node B (eNB) may be generally used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" can be used to describe a base station, a carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs with service subscriptions with the network provider. A small cell may be a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communication system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. The communication links 125 may transmit bidirectional communications using FDD (e.g., using paired spectrum resources) or TDD operation (e.g., using unpaired spectrum resources). Each communication link 125 may include one or more carriers, where each carrier may span a different frequency range and define a channel structure for modulation of information conveyed on the UL, DL, or both UL and DL over the frequency range. For example, each carrier may include one or more formatting channels, one or more control channels, one or more indicator channels, one or more data channels, and the like. Each carrier may have a designated channel number (e.g., E-UTRA Absolute Radio Frequency Channel Number (EARFCN), etc.) based on a relationship between the channel number and the carrier frequency within an operating band.

Each carrier may be a waveform signal made up of multiple sub-carriers (e.g., orthogonal sub-carriers, etc.), which are also commonly referred to as tones, bins, or the like. Each sub-carrier may be modulated with information (e.g., reference signals, control information, overhead information, user data, etc.). The spacing between adjacent sub-carriers may be fixed, and the total number of sub-carriers (K) may be dependent on the carrier bandwidth. For example, K may be equal to 72, 180, 300, 600, 900, or 1200 with a sub-carrier spacing of 15 kilohertz (KHz) for a corresponding carrier bandwidth (with guardband) of 1.4, 3, 5, 10, 15, or 20 megahertz (MHz), respectively. The carrier bandwidth may also be partitioned into sub-bands. For example, a sub-band may cover 1.08 MHz, and a carrier may have 1, 2, 4, 8 or 16 sub-bands.

Wireless communication system 100 may support operation on multiple cells or carriers, a feature which may be referred to as carrier aggregation (CA) or multi-carrier operation. "The term 'component carrier' (CC) may refer to each of the multiple carriers utilized by a UE in CA operation, and may be distinct from other portions (e.g., other carriers, etc.) of system bandwidth. In CA operation, a UE 115 may be configured to utilize multiple downlink and/or uplink CCs concurrently to provide greater operational bandwidth and, e.g., higher data rates. CCs used in CA operation may be any suitable bandwidth (e.g., 1.4, 3, 5, 10, 15, or 20 megahertz (MHz), etc.), and each individual CC may provide the same capabilities as, for instance, a single carrier based on Release 8 or Release 9 of the LTE standard. Thus, individual CCs may be backwards compatible with legacy UEs 115 (e.g., UEs 115 implementing LTE Release 8 or Release 9); while also being utilized by other UEs 115 (e.g., UEs 115 implementing LTE versions after Release 8/9) configured for CA or in single carrier mode. Alternatively, a CC may be configured to be used in combination with other CCs and may not carry some channels used to support single carrier mode (e.g., format or control channels, etc.). CA may be used with both FDD and TDD component carriers.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ MIMO techniques that may take advantage of multi-path environments to transmit multiple spatial layers carrying the same or different coded data. MIMO techniques include SU-MIMO techniques in which the same or different data streams are communicated on multiple layers between a base station 105 and a single UE 115 and MU-MIMO in which multiple streams may be transmitted to or received from spatially-distinguishable users. MU-MIMO may also be called spatial division multiple access (SDMA). MU-MIMO spatial layers may be aligned (e.g., use the same resource blocks) or un-aligned.

Additional multiple-user techniques include non-orthogonal multiple access (NOMA), where different modulation layers may be intended for different UEs. In some examples, signals for NOMA transmissions may be modulated using hierarchical and/or superposition modulation, in which a first data stream may be modulated for transmission on a base layer of a signal and a second data stream may be modulated for transmission on an enhancement layer of the signal. For example, a base station may transmit a signal having an enhancement layer superpositioned on a base layer to one or more UEs. Additionally or alternatively, the modulation of the first data stream onto the base layer and the second data stream onto the enhancement layer may be hierarchical, in which a symbol constellation of the transmitted signal includes sub-constellations associated with the base layer and enhancement layer. In some examples, a UE may transmit multiple hierarchical and/or superposition modulation layers to a base station in a similar manner.

Hierarchical and/or superposition modulation may be understood as a split of transmission power between the base layer and enhancement layer. For a UE to which the base layer is directed, the enhancement layer may be seen as interference. However, the signal-to-noise ratio (SNR) of the base layer may be at a level that allows successful demodulation and decoding of a first data stream from the base layer even in the presence of interference from the enhancement layer. A UE to which the enhancement layer is directed may demodulate and/or decode symbols and/or data received on the base layer, and then perform interference cancellation to cancel the signal of the base layer. The UE may then demodulate and decode a second data stream from the remaining signal after interference cancellation. When multiple layers in NOMA downlink transmissions share some or all of the same resources (e.g., have partially or fully overlapping resource blocks), a UE may perform an interference cancellation operation on one or more of the layers of the NOMA downlink transmissions, to identify and decode data streams on other layers that are intended for the UE.

Additionally or alternatively, interference cancellation may be used for SDMA. For example, a base station may transmit an MU-MIMO transmission including a first data stream for a first UE on a first spatial layer and a second data stream for a second UE on a second spatial layer. The first UE may receive the transmitted signal and demodulate or decode a signal associated with the second spatial layer to perform interference cancellation of the second spatial layer. The first UE may then demodulate and decode the first data stream from the remaining signal after interference cancellation. The second UE may receive the transmitted signal and decode the second data stream (with or without using interference cancellation). In this instance, the portion of the transmission to the first UE is also considered an enhancement layer transmission, as the transmission parameters (e.g., modulation and coding scheme (MCS), etc.) may assume that interference cancellation is being carried out at the first UE to cancel the portion of the transmission to the second UE. As used herein, the term "enhancement layer" refers to a portion of a transmission that is transmitted assuming that the receiver will perform interference cancellation for one or more base layers of the transmission (e.g., to the same or a different receiver) to achieve a desired or intended error rate. The term "base layer" refers to a transmission or portion of a transmission that is transmitted assuming no interference cancellation of other layers at the receiver.

The techniques used for a transmission by a base station 105 may be defined by a transmission strategy (TS). Transmission strategies may include a variety of techniques for allocation of resources to UEs 115. For example, transmissions to different UEs 115 may be differentiated by frequency (e.g., FDMA), spatial layer (e.g., SDMA), or NOMA techniques. Each TS may be associated with one or more data streams transmitted to one or more UEs over one or more non-orthogonal channels using various transmission parameters including transmission power, transmission power split between layers, precoding used for spatial layers, time resources, frequency resources, and the like. As used herein, "non-orthogonal channels" includes channels of a carrier between a multiple-antenna transmitter and a multiple-antenna receiver for possible transmission layers including both orthogonal and non-orthogonal layers. For example, non-orthogonal channels for a carrier may include channels for transmission techniques such as SU-MIMO, MU-MIMO, and/or NOMA techniques.

In LTE/LTE-A, channel state information (CSI) feedback allows downlink transmissions to be adaptively optimized based on the characteristics of the channel. Generally, a base station 105 (e.g., an eNB) may configure a UE 115 in a transmission mode (TM), which includes operation according to one or more spatial diversity techniques and defines a set of antenna ports for which the UE 115 performs measurements on reference signals (e.g., cell-specific reference signals (CRS), CSI reference signals (CSI-RS), UE-specific reference signals (UE-RS), etc.). The UE feeds back CSI in the form of recommended transmission formats, which may be TM dependent. CSI feedback may include rank indicator (RI), which indicates the number of layers recommended for MIMO transmissions, a precoding matrix indicator (PMI), which is an index of the recommended MIMO precoding matrix in a predefined precoding codebook corresponding to the RI, precoding type indicator (PTI) and channel quality indicator (CQI), which is an indication of the channel quality (e.g., signal-to-noise ratio (SNR)) corresponding to the reported RI/PMI. CQI may be defined as an index to a code rate and modulation order (e.g., QPSK, 16QAM, 64QAM, etc.), which may translate to a maximum transport block size that can be received by the UE 115 at a certain block error rate (BLER). UEs 115 can report CSI feedback periodically or aperiodically upon receiving a CSI request from the base station 105. Thus, UEs 115 generally measure the MIMO channel according to antenna ports defined by the TM, select a desired transmission strategy, and report CSI that corresponds to the desired TS. However, for MU-MIMO, the base station 105 may have many transmission strategies to choose from in a given transmission interval and CSI reported from different UEs may result in transmission strategies selected by the UEs 115 that are not combinable.

In some embodiments, the components of the wireless communication system 100, including the base stations 105 and/or UEs 115, may be configured in accordance with improved channel feedback and scheduling techniques, as described in the present disclosure.

Figure 2:
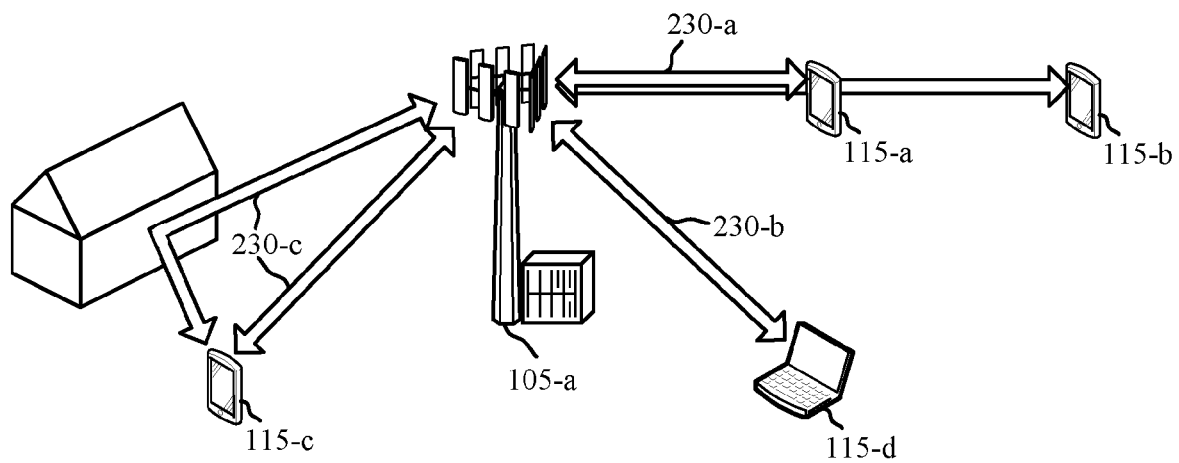
FIG. 2 shows an example wireless communication environment in which an improved channel feedback design for frequency selective channels may be employed, in accordance with various aspects of the present disclosure.

FIG. 2 shows an example wireless communication environment 200 in which an improved channel feedback design for frequency selective channels may be employed, in accordance with various aspects of the present disclosure. In the wireless communication environment 200, the UEs 115-a, 115-b, 115-c, and 115-d may be connected to a base station 105-a (e.g., a base station of an eNB).

The base station 105-a may configure transmission resources for non-orthogonal channels in a number of ways. For example, the base station 105-a may configure transmission resources of a non-orthogonal channel for transmission of a plurality of downlink transmissions to a plurality of UEs 115-a, 115-b in accordance with MU-MIMO techniques or NOMA techniques. The base station 105-a may alternatively configure transmission resources of the non-orthogonal channel (or a different channel) for transmission of a downlink transmission to a UE 115-c in accordance with SU-MIMO techniques. The base station 105-a may alternatively configure transmission resources of the non-orthogonal channel (or a different channel) for a single-layer downlink transmission 230-b to a UE 115-d.

The configuration of transmission resources by the base station 105-a may be based at least in part on channel feedback information received from each of the UEs 115-a, 115-b, 115-c, and 115-d, which channel feedback information may be enhanced in accordance with the channel feedback techniques described in the present disclosure.

Figure 3:
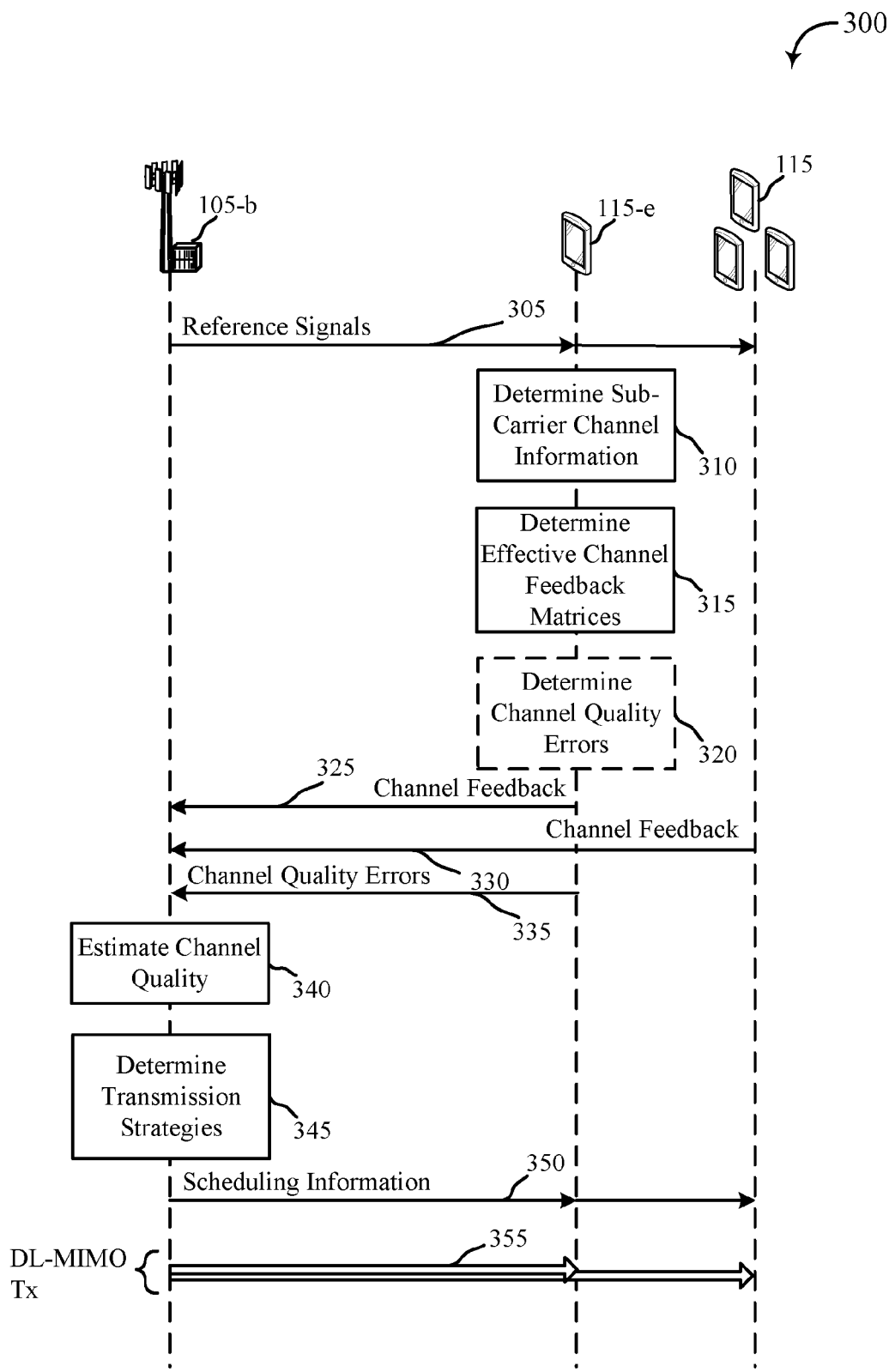
FIG. 3 illustrates an example message flow for wireless communication in a MIMO system employing frequency selective channels, in accordance with various aspects of the present disclosure.

FIG. 3 illustrates an example message flow 300 for a wireless communication system that may operate with frequency selective channels, in accordance with various aspects of the present disclosure. In some examples, the base station 105-b and UE 115-e may be examples of aspects of the base stations 105 and UEs 115 described with reference to FIG. 1 or 2.

The base station 105-b may transmit reference signals 305, which in some examples may include one or more of a CRS, a CSI-RS, and/or a UE-RS, and may include multiple reference signals of the same type transmitted from different antenna ports. The reference signals 305 may be transmitted over a non-orthogonal channel.

At block 310, the UE 115-e may determine sub-carrier channel information for the non-orthogonal channel. For example, the UE 115-e may measure the reference signals 305 and determine multiple channel feedback matrices M for respective sub-carriers of one or more sub-bands for the non-orthogonal channel. In some examples, the respective sub-carriers may include all of the sub-carriers of a sub-band. In other examples, the respective sub-carriers may include an interlaced subset of sub-carriers of the sub-band. Each channel feedback matrix M may be an $N_T \times N_T$ Hermitian matrix, where $N_T$ is a number of antennas of the base station 105-b that can transmit over the non-orthogonal channel. Each of the channel feedback matrices may be based on a channel matrix H (e.g., an $N_R \times N_T$ matrix, where $N_R$ is a number of antennas of the UE 115-e that can receive over the MIMO channel) and a noise covariance matrix $R_{NN}$ (e.g., an $N_R \times N_R$ matrix) for a sub-carrier of the plurality of sub-carriers and may be of a type $M \stackrel{\text{def}}{=} H^H R_{NN}^{-1} H$, where $H^H$ denotes a conjugate transpose of H.

For a flat fading channel and stationary interference, each of the matrices M may be determined as a function of a precoding matrix, as $M(P) = P^H H^H R_{NN}^{-1} HP = P^H M(I) P$, where P is a precoding matrix. For a 2×2 MIMO case and given precoding matrix, P, the matrix M(P) may take the form:

$$\begin{bmatrix} M_{00} & M_{01} \\ M_{10} & M_{11} \end{bmatrix}.$$

In some cases, the information in the matrix may be represented by the real numbers $M_{00}$, $M_{11}$, and $|M_{01}|^2$ (i.e., the modulus square of the off-diagonal element).

For a given precoding matrix and set of sub-carriers (i.e., tones), the matrix M(t) for tone t may take the form:

$$\begin{bmatrix} M_{00}(t) & M_{01}(t) \\ M_{10}(t) & M_{11}(t) \end{bmatrix}.$$

At block 315, the UE 115-e may determine one or more effective channel feedback matrices $\tilde{M}$ for the sub-band. The effective channel feedback matrices $\tilde{M}$ may be based on the channel feedback matrices M. Each of the effective channel feedback matrices may be associated with a corresponding set of transmission strategies, where each of the corresponding sets of transmission strategies includes one or more transmission strategies of a plurality of transmission strategies for the non-orthogonal channel. In some cases, the plurality of transmission strategies for the non-orthogonal channel may include at least one single user transmission strategy (e.g., a SU-MIMO transmission strategy) and at least one multiple-user transmission strategy (e.g., a MU-MIMO or NOMA transmission strategy).

In some embodiments, the UE 115-e may partition the plurality of transmission strategies for the non-orthogonal channel into the respective sets of transmission strategies. For example, the UE 115-e may be configured with predetermined groups of transmission strategies. Additionally or alternatively, the base station 105-b may send signaling indicating groups of transmission strategies. In some examples, the sets may be disjoint sets. In some examples, each of the sets of transmission strategies may include transmission strategies utilizing a same precoding matrix, and thus, an effective channel feedback matrix may be determined for each of a number of precoding matrices.

In some embodiments, an effective channel feedback matrix $\tilde{M}$ may include at least one indicator of effective individual layer channel quality (e.g., the diagonal components $\tilde{M}_{00}$ and $\tilde{M}_{11}$ of the effective channel feedback matrix) and an indicator of effective combined layer channel quality (e.g., the modulus square of the off-diagonal component $|\tilde{M}_{01}|^2$ of the effective channel feedback matrix). In some examples, the effective channel feedback matrix $\tilde{M}$ may be calculated using a set of channel quality functions (e.g., an effective SNR formula) evaluated for a subset of transmission strategies. In some embodiments, the set of channel quality functions may be selected to optimize a particular error metric, such as a maximum capacity error across the corresponding set of transmission strategies, or an average capacity error across the corresponding set of transmission strategies. Additionally or alternatively, the set of channel quality functions may be selected based at least in part on a likelihood of selection of transmission strategies of the corresponding set of transmission strategies. The likelihood may be based at least in part on the capacity of each transmission strategy in the corresponding set of transmission strategies. Additionally or alternatively, the likelihood may be determined using information related to transmission strategies for prior transmissions, estimated amount of data transmission, or channel spatial characteristics. In some examples, an indication of the set of channel quality functions may be received at the UE 115-e from the base station 105-b.

For corresponding sets of rank 2 transmission strategies, an effective channel feedback matrix $\tilde{M}$ may be determined for each precoding matrix P and take the form:

$$\begin{bmatrix} \tilde{M}_{00} & \tilde{M}_{01} \\ \tilde{M}_{10} & \tilde{M}_{11} \end{bmatrix},$$

with the matrix being symmetrical about the diagonal including elements $\tilde{M}_{00}$ and $\tilde{M}_{11}$. In some cases, the information in the 2×2 matrix may be represented by the three real numbers $\tilde{M}_{00}, \tilde{M}_{11}$, and $|\tilde{M}_{01}|^2$ (i.e., the modulus square of the off-diagonal element).

In some examples, the real number $\tilde{M}_{00}$ may be determined from a single user, single layer effective SNR as:

$$\tilde{M}_{00} \stackrel{\text{def}}{=} G_M\{1+M_{00}(t)\}-1,$$

where the expression $G_M\{\bullet\}$ is defined as the geometrical mean of the expression $\{\bullet\}$ for the tones t. Similarly, the real number $\tilde{M}_{11}$ may be determined from a single user, single layer effective SNR as:

$$\tilde{M}_{11} \stackrel{\text{def}}{=} G_M\{1+M_{11}(t)\}-1.$$

The real number $|\tilde{M}_{01}|^2$ or $\tilde{T}$ (where $\tilde{T} \stackrel{\text{def}}{=} |\tilde{M}_{01}|^2$) may be determined from an effective SNR formula for a particular transmission strategy as:

$$\tilde{T}(E_{x00} = e_T; \gamma_0 = 0; \mu_1 = v) =$$
$$\frac{1}{e_T}(v + \tilde{M}_{11})\left((1 + e_T\tilde{M}_{00}) - G_M\left\{1 + e_T M_{00}(t) - \frac{e_T T(t)}{v + M_{11}(t)}\right\}\right),$$

where $$\left[\mu_k \stackrel{\text{def}}{=} \frac{1}{\gamma_k}\right].$$

For example, the particular transmission strategy may be an SU-MIMO transmission using two layers and equal power allocation between layers. In this case, the real number $|\tilde{M}_{01}|^2$ or $\tilde{T}$ may be determined as:

$$\tilde{T}(E_{x00} = e_T; \gamma_0 = 0; \mu_1 = v) =$$
$$2(2 + \tilde{M}_{11})\left(\left(1 + \frac{1}{2}\tilde{M}_{00}\right) - G_M\left\{1 + \frac{1}{2}M_{00}(t) - \frac{\frac{1}{2}T(t)}{2 + M_{11}(t)}\right\}\right),$$

In some embodiments, the UE 115-e may alternatively determine $\tilde{T}$ from the full capacity of the non-orthogonal channel (e.g., based on log det(1+M)). Also, in some embodiments, it may be beneficial to let the UE 115-c select a formula for determining $\tilde{T}$ (e.g., from a plurality of formulas defined for different transmission strategies) to reduce the error for a particular transmission strategy (e.g., a transmission strategy of choice).

A desired property of the effective channel feedback matrix may be good performance independent of channel type. That is, the effective channel feedback matrix for a flat fading channel may satisfy the condition $\tilde{M}=M$. In some examples, the base station 105-b determines SNR from $\tilde{M}$ using an SNR formula for a flat fading channel. In turn, this may determine the selection criteria for the SNR formula used by the UE 115-e. Thus, the UE 115-e may determine effective channel feedback matrices using the effective SNR formulas for the transmission strategies involved, and the same formulas may be used for SNR determinations at the base station 105-b.

At block 320, the UE 115-e may optionally determine, for each transmission strategy of a set of transmission strategies (or for each transmission strategy of each set of transmission strategies), an amount of channel quality error (e.g., SNR error, etc.) that may result from a corresponding effective channel feedback matrix. In some examples, the channel quality error may be based on an average error for a corresponding transmission strategy (e.g., compared to an average SNR based on a channel feedback matrix that is specific to the corresponding transmission strategy). For each channel quality error, the UE 115-e may optionally determine whether the channel quality error is greater than a threshold.

At 325, the UE 115-e may report (e.g., to the base station 105-b) channel feedback information for channel quality estimation for the UE 115-e across the plurality of transmission strategies. The channel feedback information may represent the one or more effective channel feedback matrices $\tilde{M}$. In some embodiments, the channel feedback information for a given effective channel feedback matrix may include at least one indicator of effective individual layer channel quality (e.g., the diagonal components $\tilde{M}_{00}$ and $\tilde{M}_{11}$ of an effective channel feedback matrix $\tilde{M}$) and an indicator of effective combined layer channel quality (e.g., the modulus square of the off-diagonal component, $|\tilde{M}_{01}|^2$ of an effective channel feedback matrix $\tilde{M}$). In some embodiments, the plurality of transmission strategies may include transmission strategies for a rank 2 non-orthogonal environment, and the at least one indicator of effective individual layer channel quality may include an effective single-user channel quality for a first layer (e.g., $\tilde{M}_{00}$) and an effective single-user channel quality for a second layer (e.g., $\tilde{M}_{11}$). In some embodiments, the indicator of effective combined layer channel quality may be calculated using a channel quality function (e.g., an SNR formula) evaluated for a subset of transmission strategies (e.g., an SU-MIMO, rank 2, equal power allocation between layers). The quantity of channel feedback information, when transmitted as described above, scales linearly with respect to the number of precoding matrices, but is constant with respect to the number of transmission strategies.

When the channel feedback information reported for a given effective channel feedback matrix includes an effective single-user channel quality for a first layer, an effective single-user channel quality for a second layer, and an indicator of effective combined layer channel quality, a report of channel feedback information may include three real numbers per effective channel feedback matrix. In some cases, the number of real numbers included in the report may be reduced, at the possible expense of performance. For example, given two different effective channel feedback matrices $\tilde{M}_{P1}$ and $\tilde{M}_{P2}$, for respective different precoding matrices P1 and P2, determined such that the matrices $P_1^H\tilde{M}_{P1}P_1$ and $P_2^H\tilde{M}_{P1}P_2$ have pairwise equal diagonal elements and the same modulus off-diagonal elements, five real numbers may be reported for the two effective channel feedback matrices: three modulus numbers and two phases.

In some embodiments, the UE 115-e may interlace periodic reports of channel feedback information for different precoding matrices. For example, the UE 115-e may report effective individual layer channel quality (e.g., $\tilde{M}_{00}, \tilde{M}_{11}$) using interlaced rank 1 reports for each precoding matrix, and may provide indicators of effective combined layer channel quality (e.g., $|\tilde{M}_{01}|^2$) for multiple precoding matrices using a rank 2 report. The periodic reporting may thus use established timing for periodic CSI reporting, and may use the same or modified periodic CSI report types. The reporting may also use spatial differential CQI for reporting effective individual layer channel quality or effective combined layer channel quality.

At 330, and before, during, and/or after 325, other UEs 115 may also report channel feedback information to the base station 105-b.

At 335, and upon determining that the channel quality error for each transmission strategy in a subset of the set of transmission strategies is greater than the threshold (e.g., at block 320), the UE 115-e may transmit an indication that the subset of transmission strategies should not be used for communication with the UE 115-e. In some examples, the indication may include a bitmap.

The base station 105-b may receive the channel feedback information transmitted at block 325 and 330, and at block 340 the base station 105-b may estimate channel quality for the plurality of transmission strategies based at least in part on the channel feedback information. The channel quality may be estimated for at least a subset of the multiple UEs 115 (including UE 115-e), for downlink transmissions over the non-orthogonal channel.

In some embodiments, the base station 105-b may estimate channel quality for a particular transmission strategy based on a channel quality function (e.g., an effective SNR formula). For example, the SNRs for respective layers at a receiver may be denoted as:

$$\begin{bmatrix} SNR_{00} & SNR_{01} \\ SNR_{10} & SNR_{11} \end{bmatrix},$$

where $SNR_{00}$ is the SNR for user 0 and layer 0. If the powers of the respective layers at the respective receiver (after interference cancellation (IC) and/or successive interference cancellation (SIC)) are denoted as:

$$\begin{bmatrix} E_{x00} & E_{x01} \\ E_{x10} & E_{x11} \end{bmatrix},$$

the effective SNR formula may take the form of:

$$SNR_{00} = E_{x00} \frac{\gamma_1 \widetilde{M_{00}} \widetilde{M_{11}} + \widetilde{M_{00}} - \gamma_1 |\widetilde{M_{01}}|^2}{\gamma_0 \gamma_1 \widetilde{M_{00}} \widetilde{M_{11}} + \gamma_1 \widetilde{M_{11}} + \gamma_0 \widetilde{M_{00}} + 1 - \gamma_0 \gamma_1 |\widetilde{M_{01}}|^2},$$

where the interference $\gamma_0$ and $\gamma_1$ are assumed to be $\gamma_0 = E_{x10}$ and $\gamma_1 = E_{x01} + E_{x11}$. Given the above effective SNR formula, the formula may be simplified for a single user, single layer transmission strategy to $SNR_{00} = E_{x00} \cdot \widetilde{M_{00}}$. The formula may be simplified for a SU-MIMO transmission strategy of rank 2, with no IC/SIC and equal power splitting between layers as:

$$SNR_{00} = \frac{1}{2}\left[\widetilde{M_{00}} - \frac{|\widetilde{M_{01}}|^2}{2 + \widetilde{M_{11}}}\right].$$

The formulas for SNRs of all users and all layers may be derived from the formula for $SNR_{00}$ by permutations. Because the effective SNRs for different transmission strategies have non-linear expressions, the effective SNRs synthesized from an effective channel feedback matrix, $\tilde{M}$, are only approximations of actual SNRs. The base station 105-b may use these approximations for scheduling, choosing a modulation and coding scheme (MCS), etc.

At block 345, the base station 105-b may determine respective transmission strategies for the downlink transmissions based on the estimated channel quality. In some embodiments, determining the respective transmission strategies for the multiple UEs 115 and 115-e may include determining a number of UE pairings for a same set of resources of the non-orthogonal channel.

At 350, the base station 105-b may transmit scheduling information for the downlink transmissions; and at block 355, the base station 105-b may transmit the downlink transmissions to at least the subset of the multiple UEs 115 and 115-e over the non-orthogonal channel, according to the respective transmission strategies.

Figure 4:
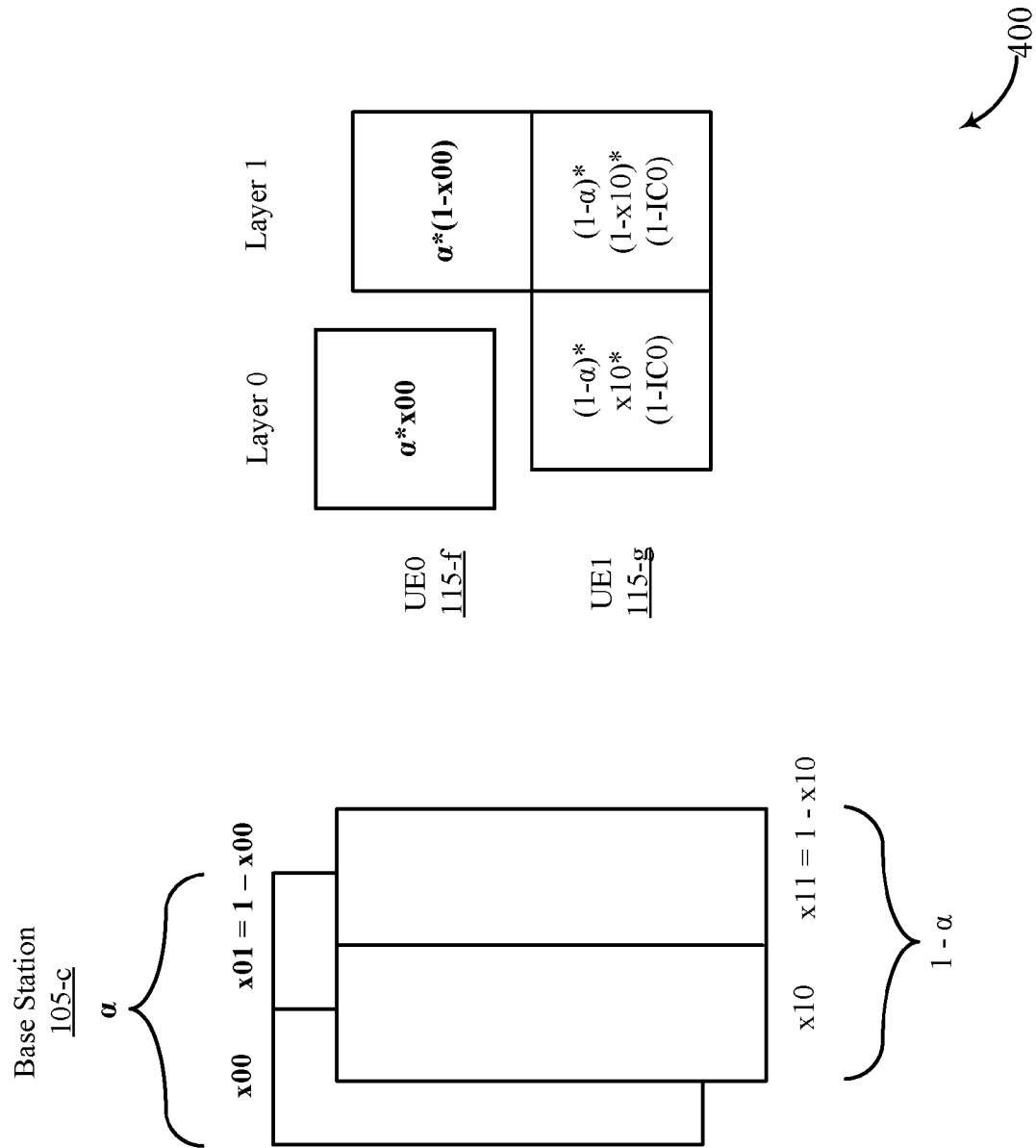
FIG. 4 shows an example of layer topology between downlink transmissions made according to a 2×2 NOMA transmission strategy, in accordance with various aspects of the present disclosure.

FIG. 4 shows an example of layer topology 400 between downlink transmissions made according to a 2×2 NOMA transmission strategy, in accordance with various aspects of the present disclosure. The NOMA downlink transmissions may be transmissions from a base station 105-c to a UE0 115-f and a UE1 115-g. The base station 105-c and UEs 115-f and 115-g may be respective examples of the base stations 105 and UEs 115 described with reference to FIGS. 1-3.

At the base station 105-c, transmit power may be split between the two UEs, with a power α allocated to UE0 115-f and a power 1−α allocated to UE1 115-g. For each UE 115, the allocated transmit power may be further split between layers (e.g., Layer 0 and Layer 1). Thus, the transmit power allocated to Layer 0 for UE0 115-f may be α*x00, and the transmit power allocated to Layer 1 for UE0 115-f may be α*(1−x00). Similarly, the transmit power allocated to Layer 0 for UE1 115-g may be (1−α)*x10, and the transmit power allocated to Layer 1 for UE1 115-g may be (1−α)*(1−x10). Assuming that the UE0 115-f employs interference cancellation (IC) for a receive power of IC0, the data streams received at the UE0 115-f on Layer 1 may be decoded by canceling the interference of the data streams transmitted to UE1 115-g using the formulas (1−α)*x10*(1−IC0) for Layer 0, and (1−α)*(1−x10)*(1−IC0) for Layer 1.

Figure 5:
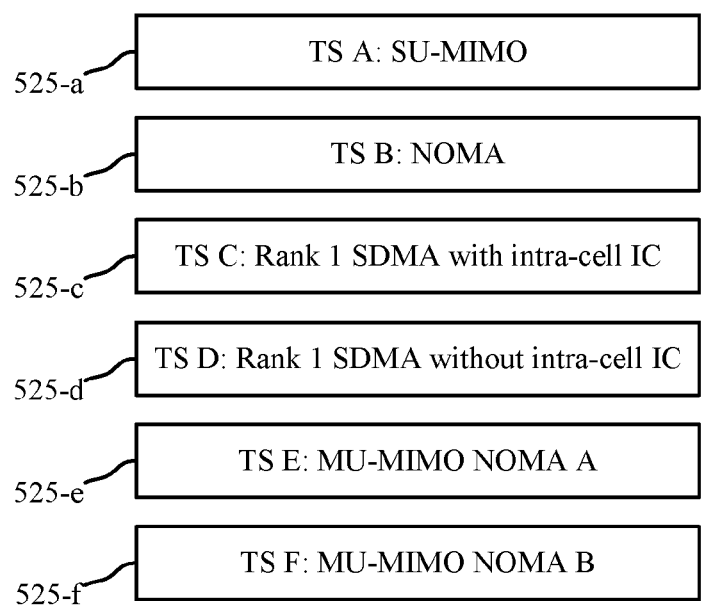
FIG. 5 shows exemplary transmission strategies that may be used for a MIMO channel, in accordance with various aspects of the present disclosure.

FIG. 5 shows exemplary transmission strategies 500 that may be used for a non-orthogonal channel, such as the non-orthogonal channel described with reference to FIG. 3 or 4, in accordance with various aspects of the present disclosure. The transmission strategies 500 may include transmission strategies (TSs) A 525-a, B 525-b, C 525-c, D 525-d, E 525-e, and/or F 525-f.

TS A 525-a may be a TS where a UE 115 can operate in SU mode (e.g., rank 1, rank 2, etc., with transmit diversity, closed loop spatial multiplexing, etc.). TS B 525-b may be a NOMA scheme where power is split between the UE 115 and a different UE 115. TS C 525-c and TS D 525-d may be rank 1 SDMA TSs using orthogonal spatial layers with and without IC, respectively. TS E 525-e and TS F 525-f may include TSs for combinations of NOMA techniques. For example, TS E 525-e and TS F 525-f may be rank 1 or 2 for the UE 115, respectively, and may use NOMA techniques on one or both spatial layers to multiplex transmissions to a different UE 115.

Figure 6:
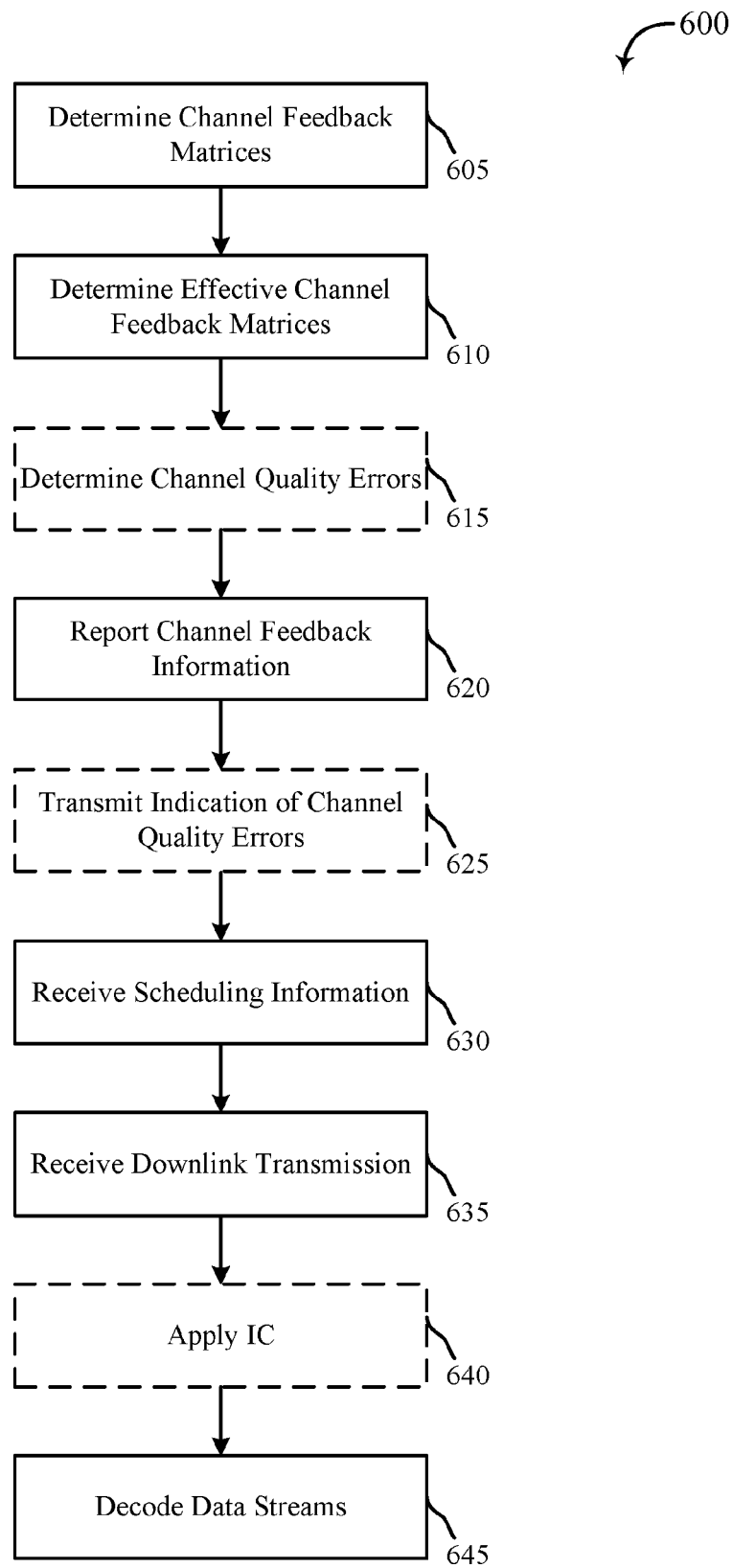
FIG. 6 shows a flow diagram of a method for wireless communication at a UE, in accordance with various aspects of the present disclosure.

FIG. 6 shows a flow diagram of a method 600 for wireless communication at a UE, in accordance with various aspects of the present disclosure. For clarity, the method 600 is described below with reference to aspects of one or more of the UEs 115 described with reference to FIGS. 1, 2, 3, 4, 12, and 13, and/or aspects of one or more of the devices 805 described with reference to FIGS. 8 and 9. In some examples, a UE 115 may execute one or more sets of codes to control the functional elements of the UE 115 to perform the functions described below. Additionally or alternatively, the UE 115 may perform one or more of the functions described below using special-purpose hardware. Additionally, blocks of method 600 that have dashed outlines may be optional for method 600.

At block 605, the UE 115 may determine a plurality of channel feedback matrices, M, corresponding to a plurality of sub-carriers of a sub-band for a non-orthogonal channel. Each of the channel feedback matrices may be based on a channel matrix, H, and a noise covariance matrix, $R_{NN}$, for a sub-carrier of the plurality of sub-carriers and be of a type $H^H R_{NN}^{-1} H$.

At block 610, the UE 115 may determine one or more effective channel feedback matrices, $\tilde{M}$, for the sub-band. The effective channel feedback matrices, $\tilde{M}$, may be based on the plurality of channel feedback matrices, M. Each of the effective channel feedback matrices may be associated with corresponding sets of transmission strategies, where each of the corresponding sets of transmission strategies includes one or more transmission strategies of a plurality of transmission strategies for the non-orthogonal channel (e.g., transmission strategies 500). In some cases, the plurality of transmission strategies for the non-orthogonal channel may include at least one single user transmission strategy (e.g., a SU-MIMO transmission strategy) and at least one multiple-user transmission strategy (e.g., a MU-MIMO transmission strategy). In some examples, the plurality of transmission strategies may additionally or alternatively include at least one multiple-layer transmission strategy including non-orthogonal layers (e.g., a NOMA transmission strategy).

In some embodiments, the UE 115 may partition the plurality of transmission strategies for the non-orthogonal channel into the corresponding sets of transmission strategies. In some examples, the sets may be disjoint sets. In some examples, each of the corresponding sets of transmission strategies may include transmission strategies utilizing a same precoding matrix, and thus, an effective channel feedback matrix may be determined for each of a plurality of precoding matrices.

In some embodiments, an effective channel feedback matrix, $\tilde{M}$, may include at least one indicator of effective individual layer channel quality (e.g., the diagonal components, $\tilde{M}_{00}$ and $\tilde{M}_{11}$, of the effective channel feedback matrix) and an indicator of effective combined layer channel quality (e.g., the off-diagonal component, $|\tilde{M}_{01}|^2$, of the effective channel feedback matrix). In some examples, the indicator of effective combined layer channel quality may be calculated using a set of channel quality functions (e.g., an effective SNR formula) evaluated for a subset of transmission strategies. In some embodiments, the set of channel quality functions may be selected to optimize a particular error metric, such as a maximum capacity error across the corresponding set of transmission strategies, or an average capacity error across the corresponding set of transmission strategies. Additionally or alternatively, the set of channel quality functions may be selected based at least in part on a likelihood of selection of transmission strategies of the corresponding set of transmission strategies. In some embodiments, the subset of transmission strategies may correspond to a SU-MIMO transmission using two layers (e.g., rank 2) and equal power allocation between layers.

At block 615, the UE 115 may optionally determine, for each transmission strategy of a corresponding set of transmission strategies (or for each transmission strategy of each set of transmission strategies), an amount of channel quality error that may result from a corresponding effective channel feedback matrix. The UE 115 may also determine, for each channel quality error, whether the channel quality error is greater than a threshold.

At block 620, the UE may report (e.g., to a base station 105) channel feedback information for channel quality estimation for the UE across the plurality of transmission strategies. The channel feedback information may represent the one or more effective channel feedback matrices. In some embodiments, the channel feedback information for a given effective channel feedback matrix may include at least one indicator of effective individual layer channel quality (e.g., the diagonal components, $\tilde{M}_{00}$ and $\tilde{M}_{11}$, of an effective channel feedback matrix, $\tilde{M}$) and an indicator of effective combined layer channel quality (e.g., the off-diagonal component, $|\tilde{M}_{01}|^2$, of an effective channel feedback matrix, $\tilde{M}$). In some embodiments, the plurality of transmission strategies may include transmission strategies for a two-layer non-orthogonal environment, and the at least one indicator of effective individual layer channel quality may include an effective single-user channel quality for a first layer (e.g., $\tilde{M}_{00}$) and an effective single-user channel quality for a second layer (e.g., $\tilde{M}_{11}$). In some embodiments, the indicator of effective combined layer channel quality may be calculated using a set of channel quality functions (e.g., an SNR formula) evaluated for a subset of transmission strategies (e.g., an SU-MIMO, rank 2, equal power allocation between layers). The reporting may be periodic and may be interlaced by association of rank and periodic report, as discussed above.

At block 625, and upon determining that the channel quality error for each of a subset of transmission strategies is greater than the threshold (e.g., as discussed above with reference to block 320 of FIG. 3), the UE 115-e may optionally transmit an indication that the subset of transmission strategies should not be used for communication with the UE 115-e.

At block 630, the UE 115 may receive, from a base station 105, scheduling information for a downlink transmission over the non-orthogonal channel. The downlink transmission may be scheduled by the base station 105 based on the channel feedback information reported by the UE 115 at block 620, and on channel feedback information received from other UEs for which downlink transmissions are made over the non-orthogonal channel. The scheduling information may indicate, for example, transmission parameters for a downlink transmission according to a transmission strategy selected by the base station based on the channel feedback information reporting by the UEs and the other UEs.

At block 635, the UE 115 may receive the downlink transmission over the non-orthogonal channel from the base station 105.

In some instances, the UE 115 may apply IC or SIC to the received downlink transmission at block 640 (e.g., the UE 115 may perform IC or SIC of a downlink transmission to another UE, on a different spatial layer, power split, etc.). At block 645, the UE 115 may decode data streams intended for the UE 115. The UE 115 may also perform HARQ processes for the decoded data streams according to known techniques.

Figure 7:
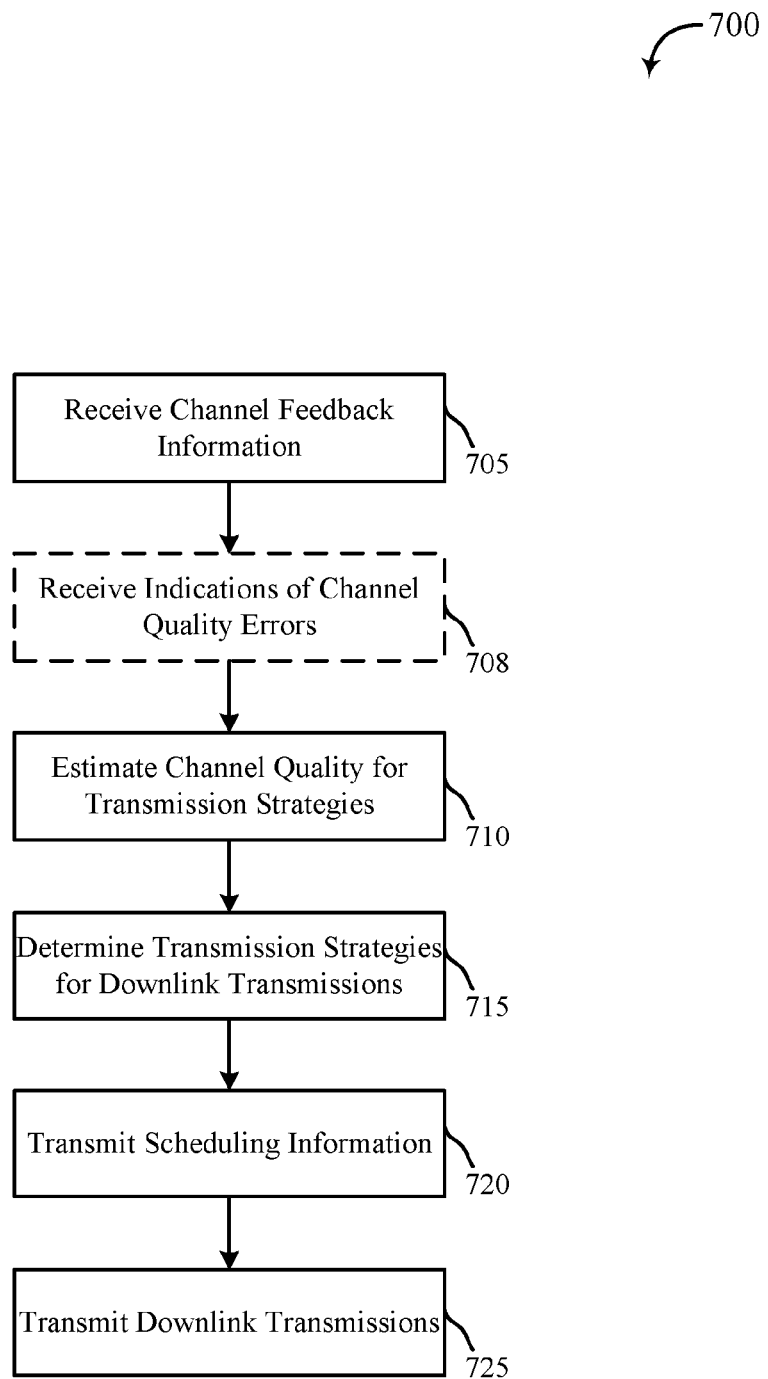
FIG. 7 shows a flow diagram of a method for wireless communication at a base station, in accordance with various aspects of the present disclosure.

FIG. 7 shows a flow diagram of a method 700 for wireless communication at a base station, in accordance with various aspects of the present disclosure. For clarity, the method 700 is described below with reference to aspects of one or more of the base stations 105 described with reference to FIGS. 1, 2, 3, 4, 12, and 13, and/or aspects of one or more of the devices 1105 described with reference to FIG. 11. In some examples, a base station 105 may execute one or more sets of codes to control the functional elements of the base station 105 to perform the functions described below. Additionally or alternatively, the base station 105 may perform one or more of the functions described below using special-purpose hardware.

At block 705, the base station may receive channel feedback information for a non-orthogonal channel from multiple UEs 115. The channel feedback information from each UE 115 may represent one or more effective channel feedback matrices for a plurality of sub-carriers of one or more sub-bands of the non-orthogonal channel. Each of the one or more effective channel feedback matrices may correspond to a set of transmission strategies of a plurality of transmission strategies for the non-orthogonal channel. In some cases, the plurality of transmission strategies for the non-orthogonal channel may include at least one single user transmission strategy (e.g., a SU-MIMO transmission strategy) and at least one multiple-user transmission strategy (e.g., a MU-MIMO transmission strategy). In some examples, the plurality of transmission strategies may additionally or alternatively include at least one multiple-layer transmission strategy including non-orthogonal layers (e.g., a NOMA transmission strategy).

In some embodiments, the channel feedback information representing a given effective channel feedback matrix may include at least one indicator of effective individual layer channel quality (e.g., $\tilde{M}_{00}$ and $\tilde{M}_{11}$) and an indicator of effective combined layer channel quality (e.g., $|\tilde{M}_{01}|^2$). In some cases, the plurality of transmission strategies may include transmission strategies for a two-layer non-orthogonal environment, and the at least one indicator of effective individual layer channel quality may include an effective single-user channel quality for a first layer (e.g., $\tilde{M}_{00}$) and an effective single-user channel quality for a second layer (e.g., $\tilde{M}_{11}$).

At block 708, the base station may receive indications from a UE 115 that a subset of transmission strategies should not be used for communication with the UE 115.

At block 710, the base station 105 may estimate channel quality for the plurality of transmission strategies, for at least a subset of the multiple UEs 115, for downlink transmissions over the non-orthogonal channel. The channel quality may be estimated based at least in part on the channel feedback information. In some embodiments, the base station 105 may estimate channel quality for a particular transmission strategy based on a channel quality function (e.g., an effective SNR formula).

At block 715, the base station 105 may determine respective transmission strategies for downlink transmissions to at least a subset of the UEs based on the estimated channel quality. In some embodiments, determining the respective transmission strategies for the at least the subset of UEs 115 may include determining a plurality of UE pairings for a same set of resources of the non-orthogonal channel. Additionally, determining the respective transmission strategies for the at least the subset UEs 115 may be based at least in part on receiving an indication from at least one UE 115 at block 708 that a subset of transmission strategies should not be used for communication with the at least one UE 115.

At block 720, the base station 105 may transmit scheduling information for the downlink transmissions based on the selected transmission strategies. At block 725, the base station 105 may transmit the downlink transmissions to the at least the subset of the UEs 115 over the non-orthogonal channel, according to the respective transmission strategies.

Figure 8:
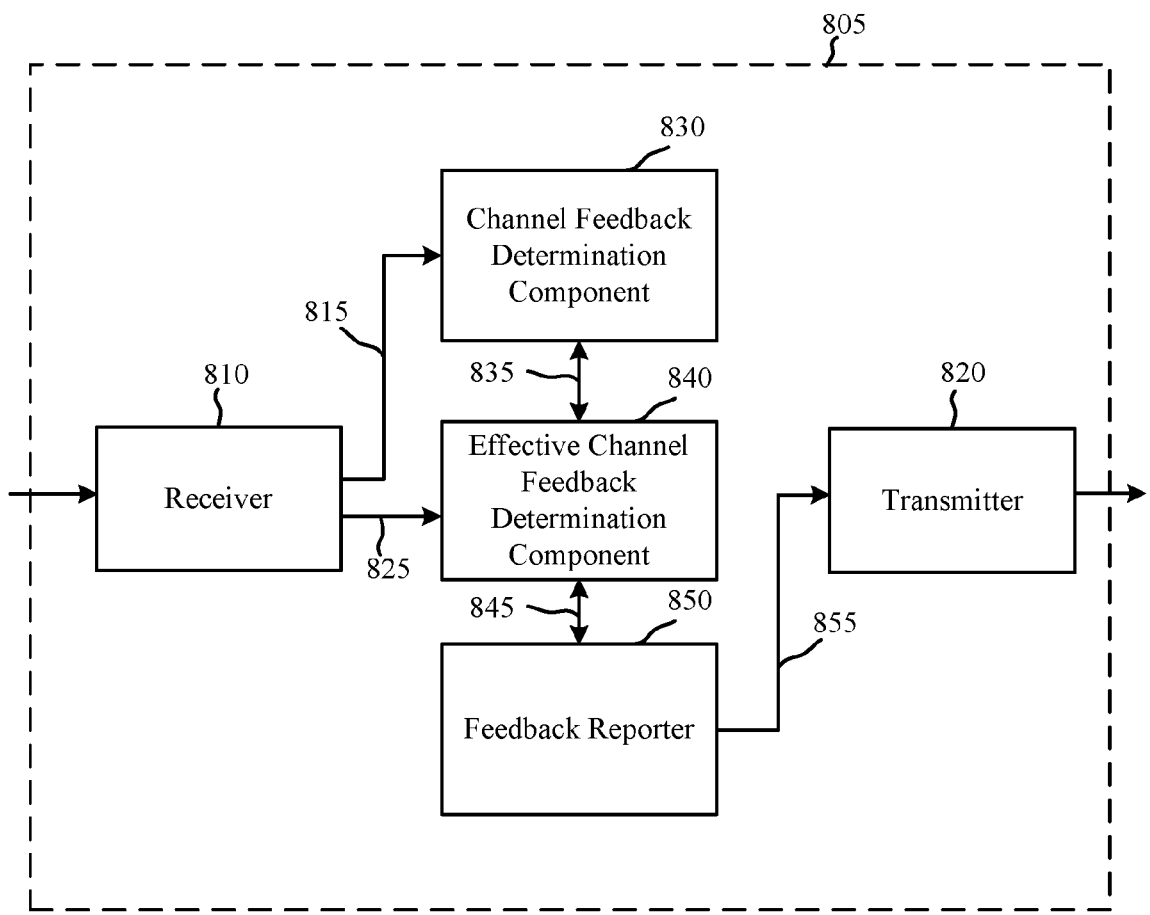
FIG. 8 shows a block diagram of a device for managing wireless communication at a UE, in accordance with various aspects of the present disclosure.

FIG. 8 shows a block diagram 800 of a device 805 for managing wireless communication at a UE, in accordance with various aspects of the present disclosure. In some examples, the device 805 may be an example of aspects of one or more aspects of a UE 115 described with reference to FIGS. 1, 2, 3, 4, 10, and 13. The device 805 may include a receiver 810, a transmitter 820, a channel feedback determination component 830, an effective channel feedback determination component 840, and a feedback reporter 850.

The device 805 may also be or include a processor (not shown). Each of these components may be in communication with each other.

The receiver 810 may include at least one radio frequency (RF) receiver operable to receive information such as packets, user data, and/or control information associated with various signals (e.g., reference signals, etc.) and/or information channels (e.g., control channels, data channels, etc.). The receiver 810 may have multiple antennas and be configured to receive signals such as reference signals (e.g., CRS, CSI-RS, UE-RS, etc.) associated with various antenna ports, and acquire channel measurements 815 such as channel gains and a noise covariance between spatial layers. The receiver 810 may pass the channel measurements 815 to the channel feedback determination component 830.

The channel feedback determination component 830 may be configured to process the channel measurements 815 and determine a plurality of channel feedback matrices M 835 corresponding to a plurality of sub-carriers of a sub-band for a non-orthogonal channel. Each of the channel feedback matrices 835 may be based on a channel matrix H and a noise covariance matrix $R_{NN}$ for a sub-carrier of the plurality of sub-carriers and be of a type $H^H R_{NN}^{-1} H$.

The effective channel feedback determination component 840 may be configured to determine one or more effective channel feedback matrices $\tilde{M}$ 845 for the sub-band. The effective channel feedback matrices $\tilde{M}$ 845 may be based on the plurality of channel feedback matrices M 835. Each of the effective channel feedback matrices 845 may be associated with corresponding sets of transmission strategies, where each of the corresponding sets of transmission strategies includes one or more transmission strategies of a plurality of transmission strategies for the non-orthogonal channel. In some cases, the plurality of transmission strategies for the non-orthogonal channel may include at least one single user transmission strategy (e.g., a SU-MIMO transmission strategy) and at least one multiple-user transmission strategy (e.g., a MU-MIMO transmission strategy). In some examples, the plurality of transmission strategies may additionally or alternatively include at least one multiple-layer transmission strategy including non-orthogonal layers (e.g., a NOMA transmission strategy). In some examples, the device 805 may receive information 825 identifying the plurality of transmission strategies from a base station, via the receiver 810.

In some embodiments, the effective channel feedback determination component 840 may partition the plurality of transmission strategies for the non-orthogonal channel into the corresponding sets of transmission strategies. In some examples, the sets may be disjoint sets. In some examples, each of the corresponding sets of transmission strategies may include transmission strategies utilizing a same precoding matrix, and thus, an effective channel feedback matrix 845 may be determined for each of a plurality of precoding matrices.

The feedback reporter 850 may be configured to report channel feedback information 855 for channel quality estimation for the UE across the plurality of transmission strategies. The channel feedback information 855 may represent the one or more effective channel feedback matrices. In some embodiments, the channel feedback information 855 for a given effective channel feedback matrix may include at least one indicator of effective individual layer channel quality (e.g., the diagonal components $\tilde{M}_{00}$ and $\tilde{M}_{11}$ of an effective channel feedback matrix $\tilde{M}$ 845) and an indicator of effective combined layer channel quality (e.g., the modulus square of the off-diagonal component $|\tilde{M}_{01}|^2$ of an effective channel feedback matrix $\tilde{M}$ 845). In some embodiments, the plurality of transmission strategies may include transmission strategies for a two-layer non-orthogonal environment, and the at least one indicator of effective individual layer channel quality may include an effective single-user channel quality for a first layer (e.g., $\tilde{M}_{00}$) and an effective single-user channel quality for a second layer (e.g., $\tilde{M}_{11}$). In some embodiments, the indicator of effective combined layer channel quality may be calculated using a set of channel quality functions (e.g., an SNR formula) evaluated for a subset of transmission strategies (e.g., an SU-MIMO, rank 2, equal power allocation between layers). The reporting may be periodic and may be interlaced by association of rank and periodic report, as discussed above. In some cases, the transmitter 820 may transmit the channel feedback information 855 via a physical control channel (e.g., PUCCH, etc.).

The transmitter 820 may include at least one RF transmitter operable to transmit the one or more signals received from other components of the device 805 as described above. In some examples, the transmitter 820 may be collocated with the receiver 810 in a transceiver.

Figure 9:
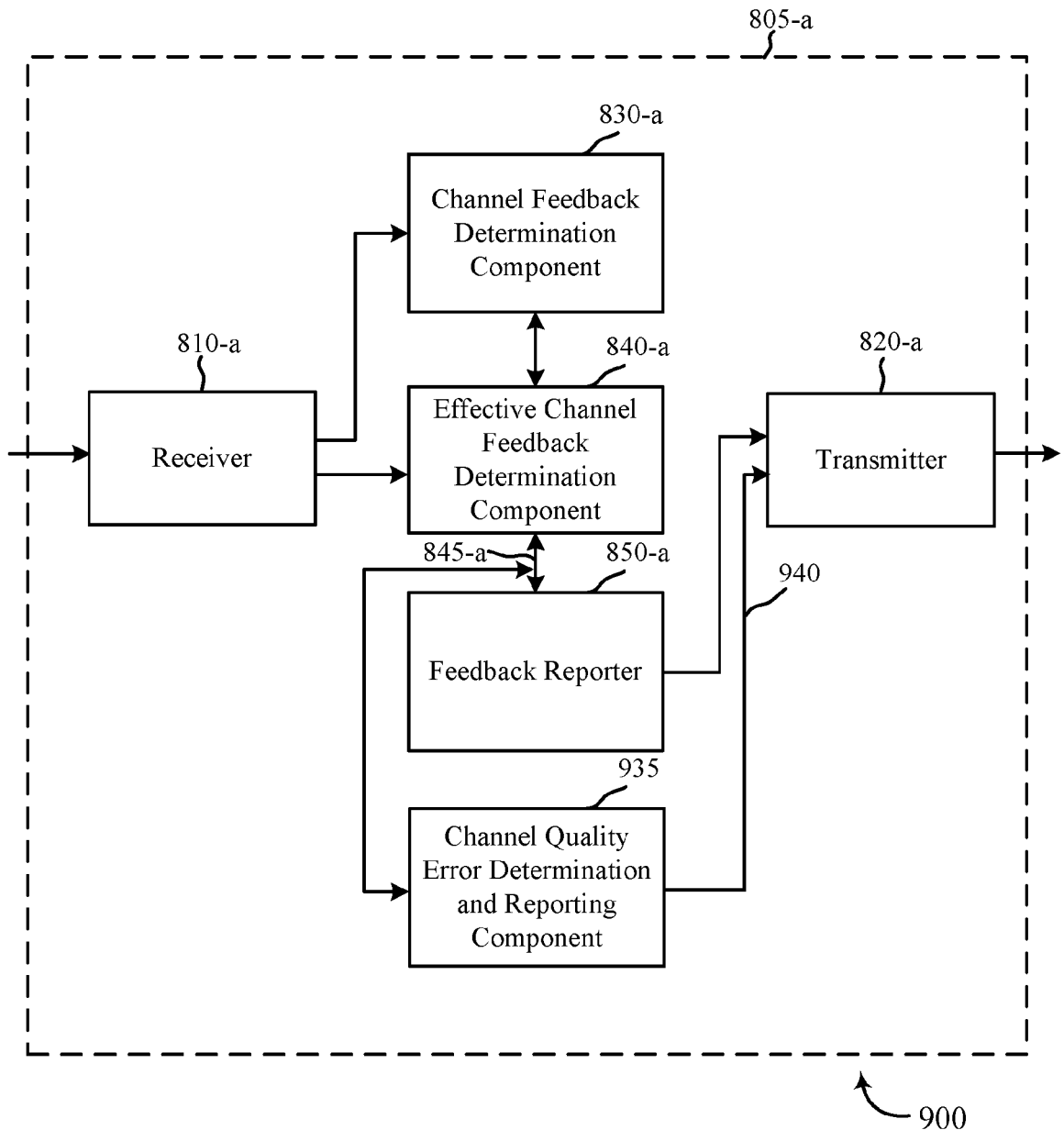
FIG. 9 shows a block diagram of a device for wireless communication at a UE, in accordance with various aspects of the present disclosure.

FIG. 9 shows a block diagram 900 of a device 805-*a* for wireless communication at a UE, in accordance with various aspects of the present disclosure. The device 805-*a* may be an example of one or more aspects of a UE 115 described with reference to FIGS. 1, 2, 3, 4, 10 and 13, and/or an example of aspects of the device 805 described with reference to FIG. 8. The device 805-*a* may include a receiver 810-*a*, a transmitter 820-*a*, channel feedback determination component 830-*a*, an effective channel feedback determination component 840-*a*, and a feedback reporter 850-*a*, which may be examples of the corresponding components of device 805. The device 805-*a* may also include a channel quality error determination and reporting component 935. The device 805-*a* may also be or include a processor (not shown). Each of these components may be in communication with each other. The receiver 810-*a* and the transmitter 820-*a* may perform the functions of the receiver 810 and the transmitter 820, of FIG. 8, respectively. For example, the receiver may generate the channel measurements 815-*a*, which may be the channel measurements 815 of FIG. 8.

The channel quality error determination and reporting component 935 may be configured to determine, for each transmission strategy of a set of transmission strategies (or for each transmission strategy of each set of transmission strategies), an amount of channel quality error that may result from a corresponding effective channel feedback matrix 845-*a* determined by the effective channel feedback determination component 840-*a*. The channel quality error determination and reporting component 935 may also determine whether the channel quality error for a transmission strategy is greater than a threshold, and upon determining that the channel quality error for each transmission strategy in a subset of transmission strategies is greater than the threshold, transmit an indication 940 (e.g., via the transmitter 820-*a*) that the subset of transmission strategies should not be used for communication with the device 805-*a*.

The functions of the components of the devices 805 described with reference to FIG. 8 or 9 may be implemented, in whole or in part, with instructions embodied in a memory, formatted to be executed by one or more general or application-specific processors (e.g., CPUs, cores, etc.). For example, the described components may represent instructions embodied in one or more functions, subroutines, classes, modules, and/or packages that may be compiled to execute on the one or more processors or may be interpreted at run-time by the one or more processors. Additionally or alternatively, various components of the devices 805 may, individually or collectively, be implemented in hardware using one or more application-specific integrated circuits (ASICs), Field Programmable Gate Arrays (FPGAs), and/or other Semi-Custom components or integrated circuits (ICs), which may be programmed (e.g., configured, synthesized from a hardware description language (HDL), etc.) in any manner known in the art.

Figure 10:
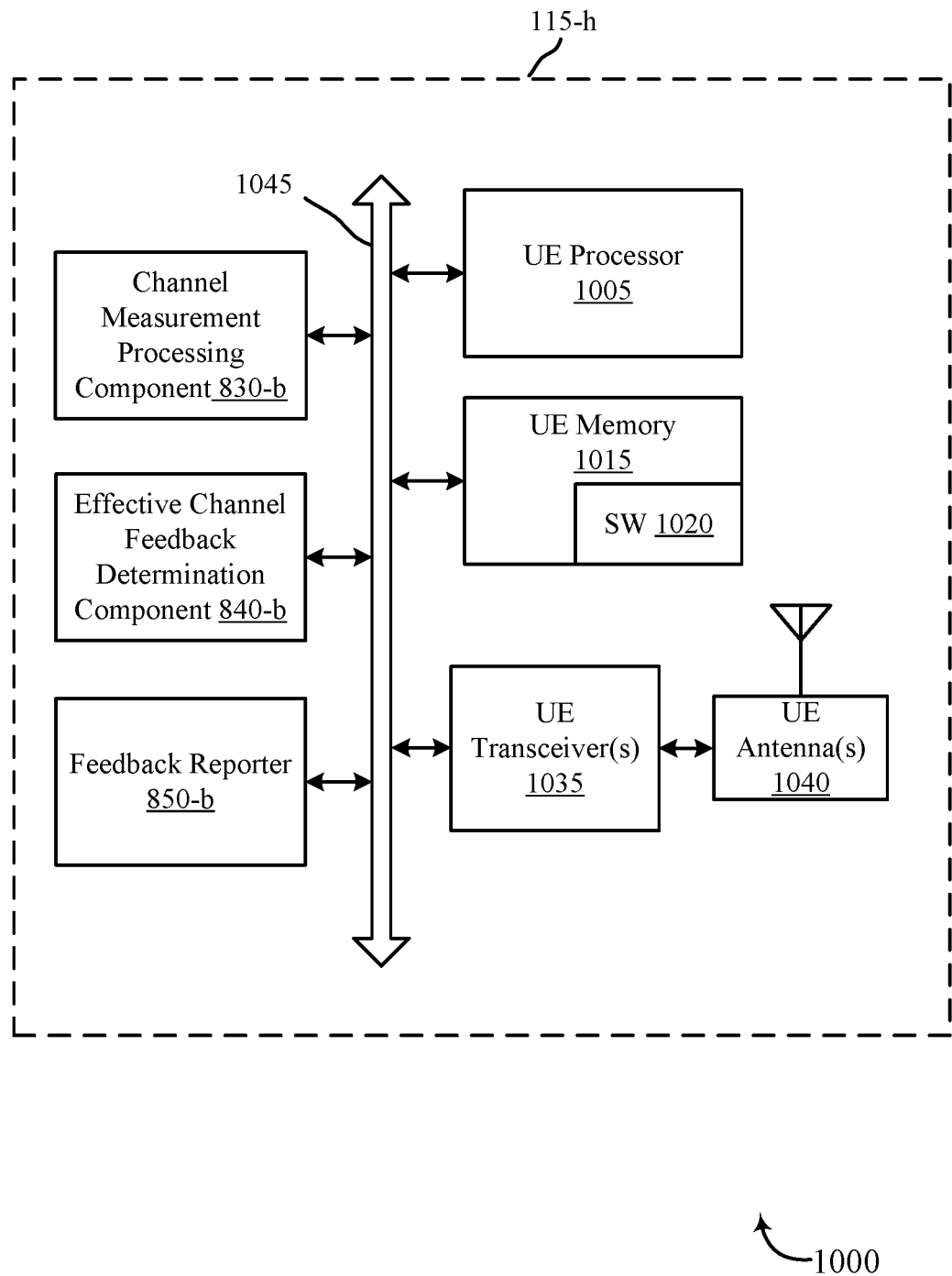
FIG. 10 shows a block diagram of a UE, in accordance with various aspects of the present disclosure.

FIG. 10 shows a block diagram 1000 of a UE 115-*h*, in accordance with various aspects of the present disclosure. In some examples, the UE 115-*h* may be an example of aspects of one or more of the UEs 115 described with reference to FIGS. 1, 2, 3, 4, and 13, and/or aspects of one or more of the devices 805 described with reference to FIGS. 8 and 9. The UE 115-*h* may be configured to implement or facilitate at least some of the UE and/or apparatus features and functions described with reference to FIGS. 1-6.

The UE 115-*h* may generally include components for bi-directional voice and data communications including components for transmitting communications and components for receiving communications. The UE 115-*h* may include one or more UE antenna(s) 1040, one or more UE transceiver(s) 1035, a UE processor 1005, and UE memory 1015 (including software (SW)/firmware code 1020). Each of these components may be in communication with each other, directly or indirectly, over one or more buses 1045. The UE transceiver(s) 1035 may be configured to communicate bi-directionally, via the UE antenna(s) 1040 and/or one or more wired or wireless links, with one or more networks, as described above. For example, the UE transceiver(s) 1035 may be configured to communicate bi-directionally with one or more base stations or apparatuses, such as one or more of the base stations described with reference to FIGS. 1, 2, 3, 4, 12, and 13, or one or more of the devices 805 described with reference to FIGS. 8 and 9. The UE transceiver(s) 1035 may also be configured to communicate bi-directionally with one or more other UEs 115. The UE transceiver(s) 1035 may include a modem configured to modulate the packets and provide the modulated packets to the UE antenna(s) 1040 for transmission, and to demodulate packets received from the UE antenna(s) 1040. The UE 115-*h* may have multiple UE antennas 1040 capable of concurrently transmitting and/or receiving multiple wireless transmissions (e. g., MIMO transmissions, etc.). The UE transceiver(s) 1035 may be capable of concurrently communicating with one or more base stations 105 via multiple component carriers.

The UE 115-*h* may include a channel feedback determination component 830-*b*, an effective channel feedback determination component 840-*b*, and a feedback reporter 850-*b*, which may be configured to perform and/or control some or all of the features and/or functions described above with reference to FIGS. 8 and 9 related to reporting channel feedback information. In some examples, the channel feedback determination component 830-*b*, effective channel feedback determination component 840-*b*, and feedback reporter 850-*b* may be part of the software/firmware code 1020 and may include instructions that are configured to cause the UE processor 1005 to perform various functions described herein (e.g., determining a plurality of channel feedback matrices, determining one or more effective channel feedback matrices, reporting channel feedback information, etc.). The channel feedback determination component 830-*b*, effective channel feedback determination component 840-*b*, and feedback reporter 850-*b* may be examples of the channel feedback determination component 830, effective channel feedback determination component 840, and feedback reporter 850 described with reference to FIGS. 8 and 9.

The UE memory 1015 may include random access memory (RAM) and/or read-only memory (ROM). The UE memory 1015 may store computer-readable, computer-executable software/firmware code 1020 containing instructions that are configured to, when executed, cause the UE processor 1005 to perform various functions described herein. Alternatively, the computer-readable, computer-executable software/firmware code 1020 may not be directly executable by the UE processor 1005 but be configured to cause a computer (e.g., when compiled and executed) to perform functions described herein. The UE processor 1005 may include an intelligent hardware device, e.g., a central processing unit (CPU), a microcontroller, an application-specific integrated circuit (ASIC), etc.

Figure 11:
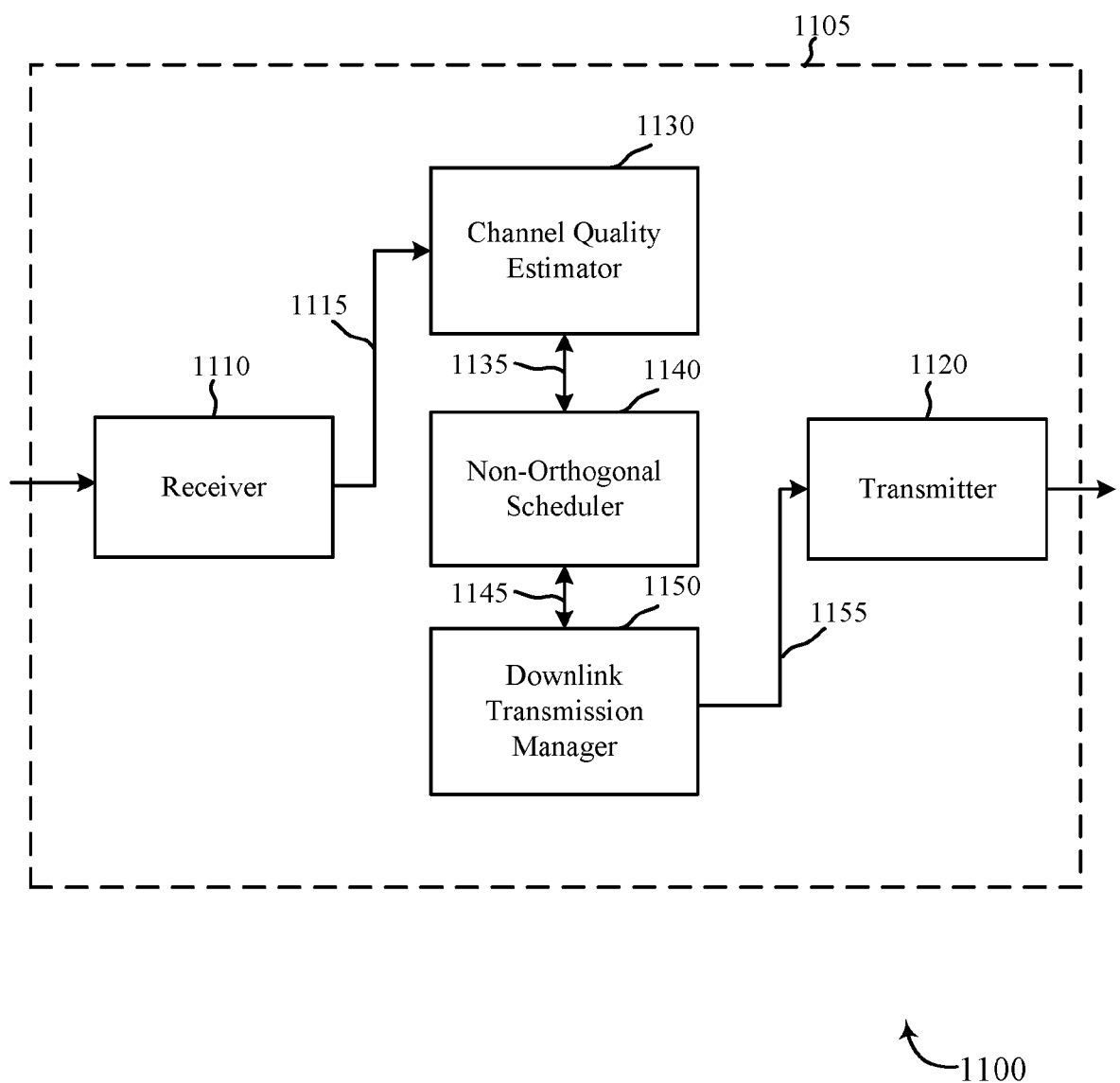
FIG. 11 shows a block diagram of a device for managing wireless communication at a base station, in accordance with various aspects of the present disclosure.

FIG. 11 shows a block diagram 1100 of a device 1105 for managing wireless communication at a base station (e.g., a base station forming part or all of an eNB), in accordance with various aspects of the present disclosure. In some examples, the device 1105 may be an example of aspects of one or more of the base stations 105 described with reference to FIGS. 1, 2, 3, 4, 12, and 13. In some examples, the device 1105 may be part of, or include, an LTE/LTE-A eNB and/or LTE/LTE-A base station. The device 1105 may include a receiver 1110, a transmitter 1120, a channel quality estimator 1130, a non-orthogonal scheduler 1140, and/or a downlink transmission manager 1150. The device 1105 may also be or include a processor (not shown). Each of these components may be in communication with each other.

The receiver 1110 may include at least one RF receiver operable to receive various types of data and/or control signals (i.e., transmissions) over one or more communication links of a wireless communication system, such as the wireless communication systems 100 or 200 described with reference to FIG. 1 or 2. The received signals may include channel feedback information 1115 received from a plurality of UEs for one or more non-orthogonal channels. The channel feedback information 1115 from each UE may represent one or more effective channel feedback matrices for a plurality of sub-carriers of one or more sub-bands of a non-orthogonal channel. Each of the one or more effective channel feedback matrices may be associated with corresponding sets of transmission strategies of a plurality of transmission strategies for the non-orthogonal channel. In some cases, the plurality of transmission strategies for the non-orthogonal channel may include at least one single user transmission strategy (e.g., a SU-MIMO transmission strategy) and at least one multiple-user transmission strategy (e.g., a MU-MIMO transmission strategy). In some examples, the plurality of transmission strategies may additionally or alternatively include at least one multiple-layer transmission strategy including non-orthogonal layers (e.g., a NOMA transmission strategy).

The channel feedback information 1115 representing a given effective channel feedback matrix may include at least one indicator of effective individual layer channel quality (e.g., $\widetilde{M_{00}}$ and $\widetilde{M_{11}}$) and an indicator of effective combined layer channel quality (e.g., $|\widetilde{M_{01}}|^2$). In some cases, the plurality of transmission strategies may include transmission strategies for a rank 2 non-orthogonal environment, and the at least one indicator of effective individual layer channel quality may include an effective single-user channel quality for a first layer (e.g., $\widetilde{M_{00}}$) and an effective single-user channel quality for a second layer (e.g., $\widetilde{M_{11}}$). In some cases, the receiver 1110 may receive the channel feedback information 1115 via a physical control channel (e.g., PUCCH, etc.).

The channel quality estimator 1130 may estimate channel quality 1135 for the plurality of transmission strategies, for at least a subset of the plurality of UEs, for downlink transmissions over the non-orthogonal channel. The channel quality 1135 may be estimated based at least in part on the channel feedback information 1115.

The non-orthogonal scheduler 1140 may determine respective transmission strategies 1145 for the downlink transmissions based on the estimated channel quality 1135. In some embodiments, determining the respective transmission strategies 1145 for the plurality of UEs may include determining a plurality of UE pairings for a same set of resources of a non-orthogonal channel.

The downlink transmission manager 1150 may be used to manage downlink transmissions 1155 to UEs over one or more non-orthogonal channels (e.g., via the transmitter 1120), according to the transmission strategies 1145 determined by the non-orthogonal scheduler 1140.

The transmitter 1120 may include at least one RF transmitter operable to transmit various types of reference signals, control signaling, and/or data transmissions over one or more communication links of a wireless communication system, such as the wireless communication system 100 or 200 described with reference to FIG. 1 or 2. In some examples, the transmitter 1120 may be used to transmit downlink transmissions 1155 according to the various transmission strategies determined by the non-orthogonal scheduler 1140.

Figure 12:
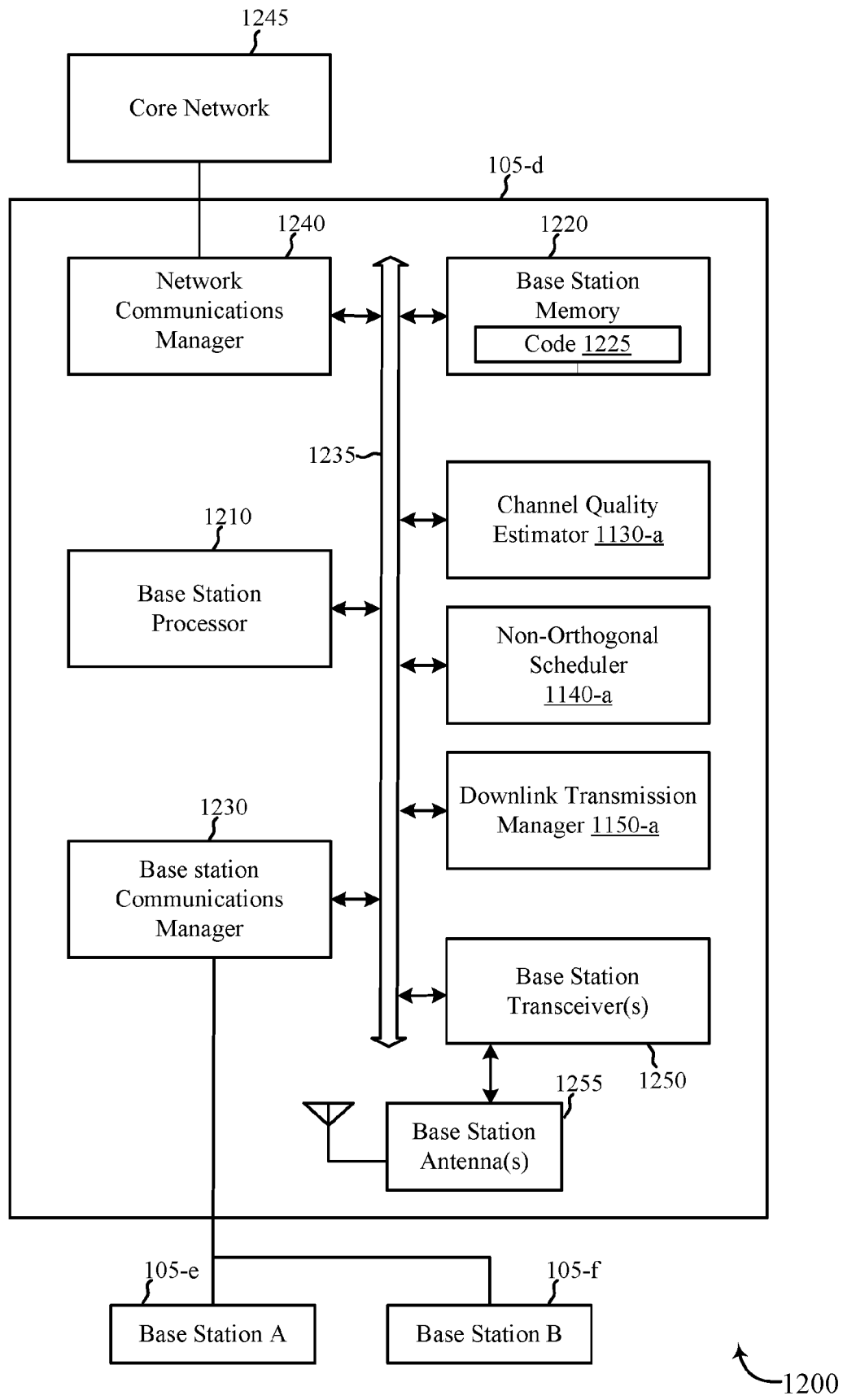
FIG. 12 shows a block diagram of a base station, in accordance with various aspects of the present disclosure.

FIG. 12 shows a block diagram 1200 of a base station 105-d (e.g., a base station forming part or all of an eNB), in accordance with various aspects of the present disclosure. In some examples, the base station 105-d may be an example of aspects of one or more of the base stations 105 described with reference to FIGS. 1, 2, 3, 4, and 13, and/or aspects of the device 1105 described with reference to FIG. 11. The base station 105-d may be configured to implement or facilitate at least some of the base station and/or apparatus features and functions described with reference to FIGS. 1-5 and 7.

The base station 105-d may include a base station processor 1210, base station memory 1220 (including software (SW)/firmware 1225), one or more base station transceiver(s) 1250, and one or more base station antenna(s) 1255. The base station 105-d may also include one or more of a base station communications manager 1230 and/or a network communications manager 1240. Each of these components may be in communication with each other, directly or indirectly, over one or more buses 1235.

The base station 105-d may also include a channel quality estimator 1130-a, a non-orthogonal scheduler 1140-a, and a downlink transmission manager 1150-a, which may be configured to perform and/or control some or all of the features and/or functions described above with reference to FIG. 10 related to estimating channel quality for a plurality of transmission strategies, determining respective transmission strategies for downlink transmissions, and managing downlink transmissions to a plurality of UEs over one or more non-orthogonal channels. In some examples, the channel quality estimator 1130-a, non-orthogonal scheduler 1140-a, and downlink transmission manager 1150-a may be part of the software/firmware code 1225 and may include instructions that are configured to cause the base station processor 1210 to perform various functions described herein. The channel quality estimator 1130-a, non-orthogonal scheduler 1140-*a*, and downlink transmission manager 1150-*a* may be examples of the channel quality estimator 1130, non-orthogonal scheduler 1140, and downlink transmission manager 1150 described with reference to FIG. 11.

The base station memory 1220 may include RAM and/or ROM. The base station memory 1220 may store computer-readable, computer-executable software/firmware code 1225 containing instructions that are configured to, when executed, cause the base station processor 1210 to perform various functions described herein. Alternatively, the computer-readable, computer-executable software/firmware code 1225 may not be directly executable by the base station processor 1210 but be configured to cause the base station 105-*d* (e.g., when compiled and executed) to perform various of the functions described herein.

The base station processor 1210 may include an intelligent hardware device, e.g., a CPU, a microcontroller, an ASIC, etc. The base station processor 1210 may process information received through the base station transceiver(s) 1250, the base station communications manager 1230, and/or the network communications manager 1240. The base station processor 1210 may also process information to be sent to the transceiver(s) 1250 for transmission through the base station antenna(s) 1255, to the base station communications manager 1230, for transmission to one or more other base stations 105-*e* and 105-*f*, and/or to the network communications manager 1240 for transmission to a core network 1245, which may be an example of one or more aspects of the core network 130 described with reference to FIG. 1.

The base station transceiver(s) 1250 may include a modem configured to modulate packets and provide the modulated packets to the base station antenna(s) 1255 for transmission, and to demodulate packets received from the base station antenna(s) 1255. The base station transceiver(s) 1250 may, in some examples, be implemented as one or more base station transmitters and one or more separate base station receivers. The base station transceiver(s) 1250 may be configured to communicate bi-directionally, via the base station antenna(s) 1255, with one or more UEs or apparatuses, such as one or more of the UEs 115 described with reference to FIGS. 1, 2, 3, 4, 10, and 13, or one or more of the devices 805 described with reference to FIGS. 8 and 9. The base station 105-*d* may, for example, include multiple base station antennas 1255 (e.g., an antenna array). The base station 105-*d* may communicate with the core network 1245 through the network communications manager 1240. The base station 105-*d* may also communicate with other base stations, such as the base stations 105-*e* and 105-*f*, using the base station communications manager 1230.

Figure 13:
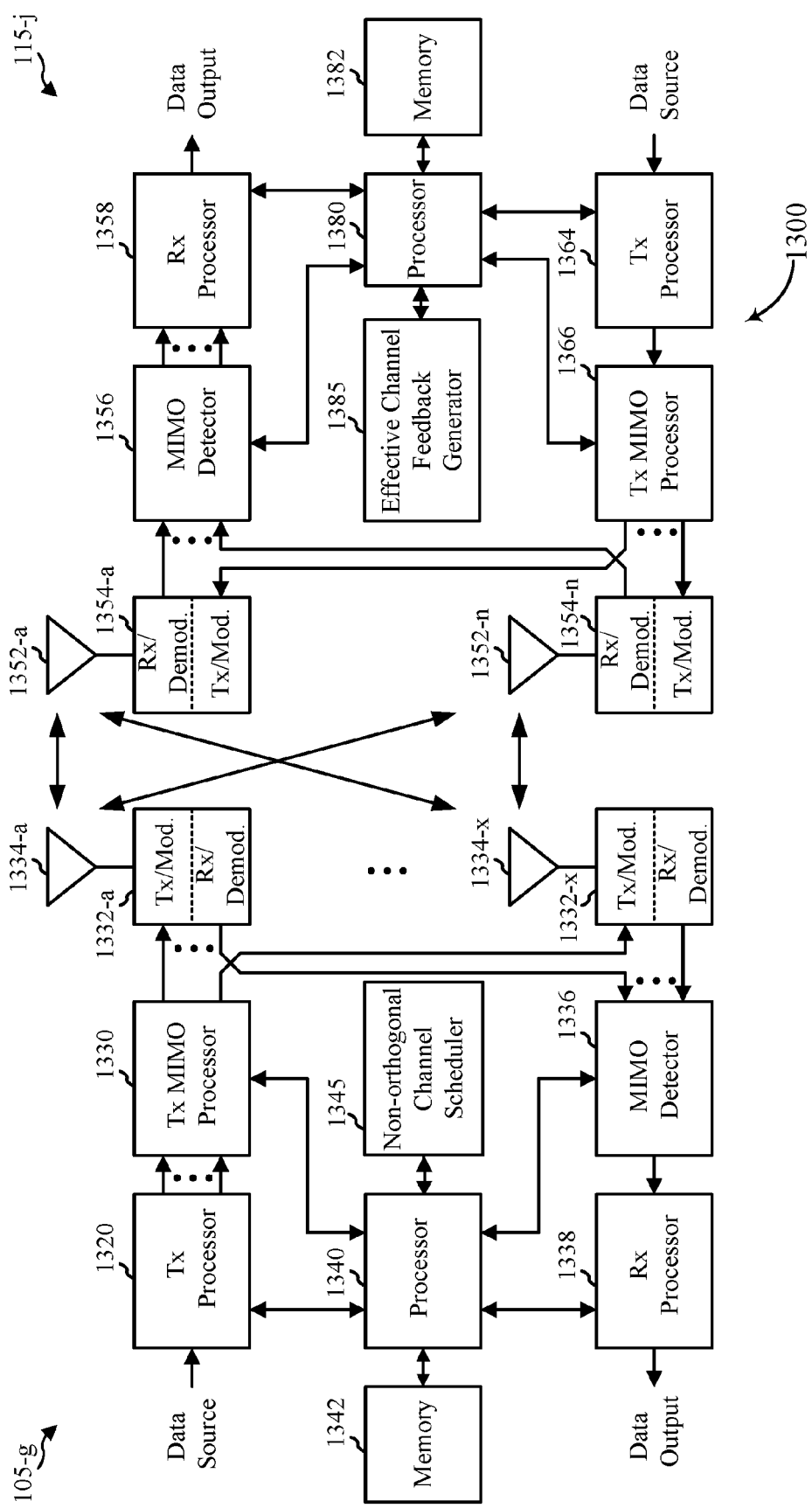
FIG. 13 is a block diagram of a MIMO communication system including a base station and a UE, in accordance with various aspects of the present disclosure.

FIG. 13 is a block diagram of a non-orthogonal communication system 1300 including a base station 105-*g* and a UE 115-*j*, in accordance with various aspects of the present disclosure. The non-orthogonal communication system 1300 may illustrate aspects of the wireless communication system 100 or 200 shown in FIG. 1 or 2. The base station 105-*g* may be equipped with antennas 1334-*a* through 1334-*x*, and the UE 115-*j* may be equipped with antennas 1352-*a* through 1352-*n*. In the non-orthogonal communication system 1300, the base station 105-*g* may be able to send data over multiple communication links at the same time. Each communication link may be called a "layer" and the "rank" of the communication link may indicate the number of layers used for communication. For example, for a communication where base station 105-*g* transmits two "layers," the rank of the communication link between the base station 105-*g* and the UE 115-*j* is two.

At the base station 105-*g*, a transmit processor 1320 may receive data from a data source. The transmit processor 1320 may process the data. The transmit processor 1320 may also generate control symbols and/or reference symbols. A transmit (TX) MIMO processor 1330 may perform spatial processing (e.g., precoding) on data symbols, control symbols, and/or reference symbols, if applicable, and may provide output symbol streams to the transmit modulators 1332-*a* through 1332-*x*. Each modulator 1332 may process a respective output symbol stream (e.g., for OFDM, etc.) to obtain an output sample stream. Each modulator 1332 may further process (e.g., convert to analog, amplify, filter, and upconvert) the output sample stream to obtain a DL signal. In one example, DL signals from modulators 1332-*a* through 1332-*x* may be transmitted via the antennas 1334-*a* through 1334-*x*, respectively.

At the UE 115-*j*, the UE antennas 1352-*a* through 1352-*n* may receive the DL signals from the base station 105-*d* and may provide the received signals to the demodulators 1354-*a* through 1354-*n*, respectively. Each demodulator 1354 may condition (e.g., filter, amplify, downconvert, and digitize) a respective received signal to obtain input samples. Each demodulator 1354 may further process the input samples (e.g., for OFDM, etc.) to obtain received symbols. A MIMO detector 1356 may obtain received symbols from all the demodulators 1354-*a* through 1354-*n*, perform MIMO detection on the received symbols, if applicable, and provide detected symbols. A receive processor 1358 may process (e.g., demodulate, deinterleave, and decode) the detected symbols, providing decoded data for the UE 115-*b* to a data output, and provide decoded control information to a processor 1380, or memory 1382.

The processor 1380 may in some cases execute stored instructions to instantiate one or more of an effective channel generator 1385. The effective channel generator 1385 may perform the functions of the modules of FIG. 8, 9, or 10 related to determining a plurality of channel feedback matrices, determining one or more effective channel feedback matrices, or reporting channel feedback information. The effective channel generator 1385 may be an example of aspects of the channel feedback determination component 830, effective channel feedback determination component 840, and feedback reporter 850 described with reference to FIGS. 8-10.

On the uplink (UL), at the UE 115-*j*, a transmit processor 1364 may receive and process data from a data source. The transmit processor 1364 may also generate reference symbols for a reference signal. The symbols from the transmit processor 1364 may be precoded by a transmit MIMO processor 1366 if applicable, further processed by the demodulators 1354-*a* through 1354-*n* (e.g., for SC-FDMA, etc.), and be transmitted to the base station 105-*g* in accordance with the transmission parameters received from the base station 105-*g*. At the base station 105-*g*, the UL signals from the UE 115-*j* may be received by the antennas 1334, processed by the modulators 1332, detected by a MIMO detector 1336 if applicable, and further processed by a receive processor 1338. The receive processor 1338 may provide decoded data to a data output and to the processor 1340 and/or memory 1342. The processor 1340 may in some cases execute stored instructions to instantiate a non-orthogonal channel scheduler 1345 which may be configured to perform the functions described above related to estimating channel quality for a plurality of transmission strategies, determining respective transmission strategies for downlink transmissions, and managing downlink transmissions to a plurality of UEs over one or more non-orthogonal channels.

The non-orthogonal channel scheduler 1345 may be an example of aspects of the channel quality estimator 1130, non-orthogonal scheduler 1140, and downlink transmission manager 1150 described with reference to FIGS. 11 and 12.

The components of the UE 115-*j* may, individually or collectively, be implemented with one or more ASICs adapted to perform some or all of the applicable functions in hardware. Each of the noted modules may be a means for performing one or more functions related to operation of the non-orthogonal communication system 1300. Similarly, the components of the base station 105-*g* may, individually or collectively, be implemented with one or more ASICs adapted to perform some or all of the applicable functions in hardware. Each of the noted components may be a means for performing one or more functions related to operation of the non-orthogonal communication system 1300.

Although some examples of the channel feedback techniques described in the present disclosure have been described in the context of a 2×2 non-orthogonal system, the techniques can more generally be applied to an N×N non-orthogonal system.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

What is claimed is:

1. A method for wireless communication at a user equipment (UE), comprising:
determining sub-carrier channel information corresponding to a plurality of sub-carriers of a sub-band for a non-orthogonal channel;
determining one or more effective channel feedback matrices for the sub-band based on the sub-carrier channel information, wherein the determining the one or more effective channel feedback matrices comprises calculating each of the one or more effective channel feedback matrices using a set of channel quality functions evaluated for a corresponding set of transmission strategies, and wherein each of the corresponding sets of transmission strategies includes one or more transmission strategies of a plurality of transmission strategies for the non-orthogonal channel, and wherein calculating an effective channel feedback matrix of the one or more effective channel feedback matrices comprises determining a first value from a single-user, single-layer channel quality function evaluated across the plurality of sub-carriers, and determining a second value based on a multiple-user, multiple-layer channel quality function evaluated across the plurality of sub-carriers; and
reporting channel feedback information for channel quality estimation for the UE across the plurality of transmission strategies, the channel feedback information representing the one or more effective channel feedback matrices.

2. The method of claim 1, wherein determining the one or more effective channel feedback matrices comprises:
identifying the set of channel quality functions for each of the one or more effective channel feedback matrices.

3. The method of claim 2, wherein identifying the set of channel quality functions is based at least in part on the corresponding sets of transmission strategies for the each of the one or more effective channel feedback matrices.

4. The method of claim 3, wherein the identifying the set of channel quality functions comprises:
selecting the set of channel quality functions to optimize at least one of a maximum capacity error across the corresponding sets of transmission strategies or an average capacity error across the corresponding sets of transmission strategies.

5. The method of claim 4, wherein selecting the set of channel quality functions is based at least in part on a likelihood of selection of transmission strategies of the corresponding sets of transmission strategies.

6. The method of claim 1, wherein the plurality of transmission strategies are grouped for the corresponding sets of transmission strategies according to respective precoding matrices.

7. The method of claim 1, further comprising:
transmitting an indication that a subset of the plurality of transmission strategies should not be used for communication with the UE.

8. A method for wireless communication at a user equipment (UE), comprising:
determining sub-carrier channel information corresponding to a plurality of sub-carriers of a sub-band for a non-orthogonal channel;
determining one or more effective channel feedback matrices for the sub-band based on the sub-carrier channel information, wherein the determining the one or more effective channel feedback matrices comprises calculating each of the one or more effective channel feedback matrices using a set of channel quality functions evaluated for a corresponding set of transmission strategies, and wherein each of the corresponding sets of transmission strategies includes one or more transmission strategies of a plurality of transmission strategies for the non-orthogonal channel;
determining, for each transmission strategy of the corresponding sets of transmission strategies, an amount of channel quality error resulting from a corresponding one of the one or more effective channel feedback matrices;
determining that the amount of channel quality error for each transmission strategy in the subset of transmission strategies is greater than a threshold;
transmitting an indication that a subset of the plurality of transmission strategies should not be used for communication with the UE; and
reporting channel feedback information for channel quality estimation for the UE across the plurality of transmission strategies, the channel feedback information representing the one or more effective channel feedback matrices.

9. The method of claim 1, wherein the sub-carrier channel information is determined based on a channel matrix and a noise covariance matrix for a sub-carrier of the plurality of sub-carriers.

10. The method of claim 1, wherein the plurality of transmission strategies comprises at least one single user transmission strategy and at least one multiple-user transmission strategy.

11. The method of claim 1, wherein the plurality of transmission strategies comprises at least one multiple-layer transmission strategy comprising non-orthogonal layers.

12. A method for wireless communication at a base station, comprising:
receiving channel feedback information from multiple user equipments (UEs) for a non-orthogonal channel, wherein the channel feedback information from each UE comprises feedback representing one or more effective channel feedback matrices for a plurality of sub-carriers of one or more sub-bands, and wherein each of the one or more effective channel feedback matrices is calculated using a set of channel quality functions evaluated for a corresponding set of transmission strategies, wherein each of the corresponding sets of transmission strategies includes one or more transmission strategies of a plurality of transmission strategies for the non-orthogonal channel, and wherein an effective channel feedback matrix of the one or more effective channel feedback matrices comprises a first value determined based on a single-user, single-layer channel quality function evaluated across the plurality of sub-carriers, and a second value determined based on a multiple-user, multiple-layer channel quality function evaluated across the plurality of sub-carriers;
estimating channel quality for the plurality of transmission strategies for at least a subset of the multiple UEs for downlink transmissions over the non-orthogonal channel based at least in part on the channel feedback information;
determining respective transmission strategies for the downlink transmissions based on the estimated channel quality; and
transmitting downlink transmissions to the at least the subset of the multiple UEs over the non-orthogonal channel according to the respective transmission strategies.

13. The method of claim 12, wherein the determining the respective transmission strategies for the multiple UEs comprises:
determining a plurality of UE pairings for a same set of resources of the non-orthogonal channel.

14. The method of claim 12, further comprising:
partitioning the plurality of transmission strategies into the corresponding sets of transmission strategies; and
transmitting an indication of the corresponding sets of transmission strategies to the multiple UEs, wherein the indication is transmitted prior to receiving the channel feedback information.

15. The method of claim 12, wherein the plurality of transmission strategies comprises at least one single user transmission strategy and at least one multiple-user transmission strategy.

16. The method of claim 12, wherein the plurality of transmission strategies comprises at least one multiple-layer transmission strategy comprising non-orthogonal layers.

17. An apparatus for wireless communication at a user equipment (UE), comprising:
a processor;
memory in electronic communication with the processor; and
instructions stored in the memory, the instructions being executable by the processor to:
determine sub-carrier channel information corresponding to a plurality of sub-carriers of a sub-band for a non-orthogonal channel;
determine one or more effective channel feedback matrices for the sub-band based on the sub-carrier channel information, wherein the determining the one or more effective channel feedback matrices comprises calculating each of the one or more effective channel feedback matrices using a set of channel quality functions evaluated for a corresponding set of transmission strategies, and wherein each of the corresponding sets of transmission strategies includes one or more transmission strategies of a plurality of transmission strategies for the non-orthogonal channel, and wherein calculating an effective channel feedback matrix of the one or more effective channel feedback matrices comprises determining a first value based on a single-user, single-layer channel quality function evaluated across the plurality of sub-carriers, and determining a second value based on a multiple-user, multiple-layer channel quality function evaluated across the plurality of sub-carriers; and
report channel feedback information for channel quality estimation for the UE across the plurality of transmission strategies, the channel feedback information representing the one or more effective channel feedback matrices.

18. The apparatus of claim 17, wherein the instructions are further executable by the processor to:
identify the set of channel quality functions for each of the one or more effective channel feedback matrices.

19. The apparatus of claim 18, wherein identifying the set of channel quality functions is based at least in part the corresponding sets of transmission strategies for each of the one or more effective channel feedback matrices.

20. The apparatus of claim 19, wherein the instructions are further executable by the processor to:
select the set of channel quality functions to optimize at least one of a maximum capacity error across the corresponding sets of transmission strategies or an average capacity error across the corresponding sets of transmission strategies.

21. The apparatus of claim 20, wherein selecting the set of channel quality functions is based at least in part on a likelihood of selection of transmission strategies of the corresponding sets of transmission strategies.

22. The apparatus of claim 17, wherein the plurality of transmission strategies are grouped for the corresponding sets of transmission strategies according to respective precoding matrices.

23. The apparatus of claim 17, wherein the instructions are further executable by the processor to:
transmit an indication that a subset of the plurality of transmission strategies should not be used for communication with the UE.

24. An apparatus for wireless communication at a user equipment (UE), comprising:
a processor;
memory in electronic communication with the processor; and
instructions stored in the memory, the instructions being executable by the processor to:
determine sub-carrier channel information corresponding to a plurality of sub-carriers of a sub-band for a non-orthogonal channel;
determine one or more effective channel feedback matrices for the sub-band based on the sub-carrier channel information, wherein the determining the one or more effective channel feedback matrices comprises calculating each of the one or more effective channel feedback matrices using a set of channel quality functions evaluated for a corresponding set of transmission strategies, and wherein each of the corresponding sets of transmission strategies includes one or more transmission strategies of a plurality of transmission strategies for the non-orthogonal channel;
determine, for each transmission strategy of the corresponding sets of transmission strategies, an amount of channel quality error resulting from a corresponding one of the one or more effective channel feedback matrices;
determine that the amount of channel quality error for each transmission strategy in the subset of transmission strategies is greater than a threshold;
transmit an indication that a subset of the plurality of transmission strategies should not be used for communication with the UE; and
report channel feedback information for channel quality estimation for the UE across the plurality of transmission strategies, the channel feedback information representing the one or more effective channel feedback matrices.

25. The apparatus of claim 17, wherein the sub-carrier channel information is determined based on a channel matrix and a noise covariance matrix for a sub-carrier of the plurality of sub-carriers.

26. The apparatus of claim 17, wherein the plurality of transmission strategies comprises at least one single user transmission strategy and at least one multiple-user transmission strategy.

27. The apparatus of claim 17, wherein the plurality of transmission strategies comprises at least one multiple-layer transmission strategy comprising non-orthogonal layers.

28. An apparatus for wireless communication at a base station, comprising:
- a processor;
- memory in electronic communication with the processor; and
- instructions stored in the memory, the instructions being executable by the processor to:
  - receive channel feedback information from multiple user equipments (UEs) for a non-orthogonal channel, wherein the channel feedback information from each UE comprises feedback representing one or more effective channel feedback matrices for a plurality of sub-carriers of one or more sub-bands, and wherein each of the one or more effective channel feedback matrices is calculated using a set of channel quality functions evaluated for a corresponding set of transmission strategies, wherein each of the corresponding sets of transmission strategies includes one or more transmission strategies of a plurality of transmission strategies for the non-orthogonal channel, and wherein an effective channel feedback matrix of the one or more effective channel feedback matrices comprises a first value determined based on a single-user, single-layer channel quality function evaluated across the plurality of sub-carriers, and a second value determined based on a multiple-user, multiple layer channel quality function evaluated across the plurality of sub-carriers;
  - estimate channel quality for the plurality of transmission strategies for at least a subset of the multiple UEs for downlink transmissions over the non-orthogonal channel based at least in part on the channel feedback information;
  - determine respective transmission strategies for the downlink transmissions based on the estimated channel quality; and
  - transmit downlink transmissions to the at least the subset of the multiple UEs over the non-orthogonal channel according to the respective transmission strategies.

29. The apparatus of claim 28, wherein determining the respective transmission strategies for the multiple UEs comprises:
- determining a plurality of UE pairings for a same set of resources of the non-orthogonal channel.

30. The apparatus of claim 28, wherein the instructions are further executable by the processor to:
- partition the plurality of transmission strategies into the corresponding sets of transmission strategies; and
- transmit an indication of the corresponding sets of transmission strategies to the multiple UEs, wherein the indication is transmitted prior to receiving the channel feedback information.

* * * * *